US009025160B2

(12) United States Patent
Moore et al.

(10) Patent No.: US 9,025,160 B2
(45) Date of Patent: May 5, 2015

(54) SPECTRAL PHASE ANALYSIS FOR PRECISION RANGING

(75) Inventors: Eric Moore, Boulder, CO (US); Robert McLeod, Boulder, CO (US)

(73) Assignee: The Regents of the University of Colorado, a body corporate, Denver, CO (US)

(*) Notice: Subject to any disclaimer, the term of this patent is extended or adjusted under 35 U.S.C. 154(b) by 581 days.

(21) Appl. No.: 13/361,888

(22) Filed: Jan. 30, 2012

(65) Prior Publication Data

US 2012/0194823 A1 Aug. 2, 2012

Related U.S. Application Data

(60) Provisional application No. 61/437,376, filed on Jan. 28, 2011.

(51) Int. Cl.
G01B 11/02 (2006.01)
G01B 9/02 (2006.01)
G01S 7/491 (2006.01)
G01S 17/32 (2006.01)

(52) U.S. Cl.
CPC ........ G01B 9/02091 (2013.01); G01B 9/02004 (2013.01); G01B 9/02044 (2013.01); G01B 9/0207 (2013.01); G01S 7/4915 (2013.01); G01S 17/325 (2013.01); G01B 2290/70 (2013.01)

(58) Field of Classification Search
CPC ........... G01B 9/02004; G01B 9/02019; G01B 9/02028; G01B 9/02044; G01B 11/02; G01B 11/14; G01B 11/26

USPC .......................................................... 356/498
See application file for complete search history.

(56) References Cited

U.S. PATENT DOCUMENTS

| 5,880,841 | A | 3/1999 | Marron et al. |
| 7,488,930 | B2 | 2/2009 | Ajgaonkar et al. |
| 2005/0280828 | A1* | 12/2005 | Fitzgerald de Boer ....... 356/497 |
| 2006/0012802 | A1* | 1/2006 | Shirley .......................... 356/603 |
| 2009/0073456 | A1* | 3/2009 | Wax et al. ..................... 356/479 |
| 2009/0125242 | A1 | 5/2009 | Choi et al. |
| 2010/0157309 | A1* | 6/2010 | Tearney et al. ............... 356/479 |

OTHER PUBLICATIONS

Adler, Desmond C. et al., "Phase-Sensitive Optical Coherence Tomography at Up to 370,000 Lines Per Second Using Buffered Fourier Domain Mode-Locked Lasers," Optics Letters, vol. 32, No. 6, pp. 626-628, Mar. 15, 2007.
Ahn, Tae-Jung et al., "Suppression of Nonlinear Frequency Sweep in an Optical Frequency-Domain Reflectometer by Use of Hilbert Transformation," Applied Optics, vol. 44, No. 35, pp. 7630-7634, Dec. 10, 2005.

(Continued)

Primary Examiner — Jonathan Hansen
(74) Attorney, Agent, or Firm — Perkins Coie LLP

(57) ABSTRACT

Interferometric path length measurements using frequency-domain interferometry form the basis of several measurement techniques, including optical frequency domain reflectometry (OFDR), optical coherence tomography (OCT), and frequency-modulated continuous wave (FMCW) radar and lidar. A phase-sensitive and self-referenced approach to frequency-domain interferometry yields absolute and relative path length measurements with axial precision orders of magnitude better than the transform-limited axial resolution of the system.

22 Claims, 18 Drawing Sheets

(56) References Cited

OTHER PUBLICATIONS

Cheng, Hsu-Chih et al., "Simultaneous Measurement of Group Refractive Index and Thickness of Optical Samples Using Optical Coherence Tomography," Applied Optics, vol. 49, No. 5, pp. 790-797, Feb. 10, 2010.

Chinn, S. R. et al., "Optical Coherence Tomography Using a Frequency-Tunable Optical Source," Optics Letters, vol. 22, No. 5, pp. 340-342, Mar. 1, 1997.

Choma, Michael A. et al., "Doppler Flow Imaging of Cytoplasmic Streaming Using Spectral Domain Phase Microscopy," Journal of Biomedical Optics, vol. 11, No. 2, pp. 024014-1-024014-8, Mar./Apr. 2006.

Choma, Michael A. et al., "Spectral-Domain Phase Microscopy," Optics Letters, vol. 30, No. 10, pp. 1162-1164, May 15, 2005.

Ciddor, Philip E., "Refractive Index of Air: New Equations for the Visible and Near Infrared," Applied Optics, vol. 35, No. 9, pp. 1566-1573, Mar. 20, 1996.

Ciddor, Philip E. et al., "Refractive Index of Air. 2. Group Index," Applied Optics, vol. 38, No. 9, pp. 1663-1667, Mar. 20, 1999.

Fujimoto, James G., "Optical Coherence Tomography for Ultrahigh Resolution In Vivo Imaging," Nature Biotechnology, vol. 21, No. 11, pp. 1361-1367, Nov. 2003.

Glombitza, U. et al., "Coherent Frequency-Domain Reflectometry for Characterization of Single-Mode Integrated-Optical Waveguides," Journal of Lightwave Technology, vol. 11, No. 8, pp. 1377-1384, Aug. 1993.

Huang, David et al., "Optical Coherence Tomography," Science, vol. 254, pp. 1178-1181, Nov. 22, 1991.

International Application No. PCT/US2012/023189, International Search Report & Written Opinion, 8 pages, Aug. 7, 2012.

Joo, Chulmin et al., "Spectral-Domain Optical Coherence Phase Microscopy for Quantitative Phase-Contrast Imaging," Optics Letters, vol. 30, No. 16, pp. 2131-2133, Aug. 15, 2005.

Leviton, Douglas B. et al., "Temperature-Dependent Absolute Refractive Index Measurements of Synthetic Fused Silica," Proc. SPIE 6273, Optomechanical Technologies for Astronomy, 11 pages, Jul. 6, 2006.

Moore, Eric D. et al., "Correction of Sampling Errors Due to Laser Tuning Rate Fluctuations in Swept-Wavelength Interferometry," Optics Express, vol. 16, No. 17, pp. 13139-13149, Aug. 18, 2008.

Na, Jihoon et al., "Self-Referenced Spectral Interferometry for Simultaneous Measurements of Thickness and Refractive Index," Applied Optics, vol. 48, No. 13, pp. 2461-2467, May 1, 2009.

Povazay, B. et al., "Submicrometer Axial Resolution Optical Coherence Tomography," Optics Letters, vol. 27, No. 20, pp. 1800-1802, Oct. 15, 2002.

Sarunic, Marinko V. et al., "Full-Field Swept-Source Phase Microscopy," Optics Letters, vol. 31, No. 10, pp. 1462-1464, May 15, 2006.

Sorin, W. V. et al., "Simultaneous Thickness and Group Index Measurement Using Optical Low-Coherence Reflectometry," IEEE Photonics Technology Letters, vol. 4, No. 1, pp. 105-107, Jan. 1992.

Swann, W.C. et al., "Accuracy Limits for Simple Molecular Absorption Based Wavelength References," Technical Digest: Symposium on Optical Fiber Measurements, pp. 15-18, 2004.

Vakoc, B. J. et al., "Phase-Resolved Optical Frequency Domain Imaging," Optics Express, vol. 13, No. 14, pp. 5483-5493, Jul. 11, 2005.

Youngquist, Robert C. et al., "Optical Coherence-Domain Reflectometry: A New Optical Evaluation Technique," Optics Letters, vol. 12, No. 3, pp. 158-160, Mar. 1987.

Yun, S.H. et al., "High-Speed Optical Frequency-Domain Imaging," Optics Express, vol. 11, No. 22, pp. 2953-2963, Nov. 3, 2003.

* cited by examiner

SPECTRAL PHASE ANALYSIS FOR PRECISION RANGING

CROSS REFERENCE TO RELATED APPLICATIONS

This application claims the benefit of U.S. Provisional Application No. 61/437,376, which was filed on Jan. 28, 2011, titled "Phase-Sensitive Swept-Source Interferometry For Absolute Ranging With Application To Measurements Of Group Refractive Index And Thickness," the entire content of which is hereby incorporated herein by reference for all purposes.

STATEMENT REGARDING FEDERALLY SPONSORED RESEARCH

This invention was made with government support under grant number IIP0637355 awarded by the National Science Foundation. The government has certain rights in the invention.

TECHNICAL FIELD

Various embodiments of the present invention relate generally to interferometry. More specifically, some embodiments of the present invention relate to spectral and swept-wavelength interferometry for both absolute and relative optical path length measurements.

BACKGROUND

Frequency-domain interferometry has been widely adopted for performing a variety of measurements in a number of application areas. Examples include swept-source and spectral-domain implementations of optical coherence tomography (OCT) for noninvasive, depth-resolved imaging for a variety of biological and medical applications; optical frequency domain reflectometry (OFDR) for fiber optic sensing and testing of telecommunications networks, modules, and components; and frequency-modulated continuous-wave radar and lidar for remote sensing, detection, and ranging. Many such applications are based upon the ability of frequency domain interferometry to perform optical path length measurements. For both low-coherence and swept-wavelength implementations of frequency-domain interferometry, the resolution of the optical path length measurement is inversely proportional to the frequency bandwidth of the optical source. Axial resolutions on the order of 1 µm have been achieved with low-coherence approaches using extremely broadband supercontinuum sources. For SS-OCT, the axial resolution is typically limited to the order of 10 µm due to the more limited spectral breadth available from swept-wavelength sources.

Axial displacement sensitivities greatly exceeding the axial resolution of frequency-domain interferometry systems have been demonstrated by numerous groups using phase-sensitive techniques based on both low-coherence interferometry using spectrally dispersed detection as well as swept-wavelength interferometry. Both modes detect spectral interference fringes as a function of optical frequency and produce time-domain optical path length data by applying a Fourier transform to the acquired fringe patterns. Small displacements of discrete reflectors can be detected by noting changes in the phase of the complex-valued time-domain data at the location in the data array corresponding to the reflector. These phase measurements provide a relative displacement measurement from scan to scan, and have been applied to surface profiling, phase imaging, and Doppler flow measurements. Heretofore, however, the submicron displacements measured via phase have been relative to an arbitrary zero point within a single depth bin defined by the source-spectral-width-limited axial resolution of the system.

SUMMARY

Systems and methods are described for spectral phase analysis for precision ranging. In some embodiments, a method includes receiving a signal (e.g., a voltage, a current, a digitized data set, etc) representing one or more spectral interference fringes. In accordance with various embodiments, the one or more spectral interference fringes may have been observed in a number of different ways. For example, the spectral interference fringes may have been detected using spectral-domain interferometry, swept-wavelength interferometry, optical frequency domain reflectometry, swept-source optical coherence tomography, spectral-domain optical coherence tomography, frequency-modulated continuous-wave radar, or frequency-modulated continuous-wave lidar.

From the signal representing the spectral interference fringes, one or more filtered temporal signals may be generated. For example, in some embodiments, generating the filtered temporal signal includes generating a temporal signal (e.g., using Fourier Transform, a Fast Fourier Transform, or a non-uniform discrete Fourier Transform) from the signal representing the spectral interference fringes and applying one or more temporal filters to the temporal signal to generate the filtered temporal signal. Then, one or more spectral signals may be generated from one or more of the filtered temporal signals. This can be done, for example, using hardware, firmware, or software. In some embodiments, a set of curve-fit parameters that approximate the phase of the one or more of the spectral signals are then identified. Using the set of curve-fit parameters one or more unknown optical path length values (e.g., represent a physical range to a point or region on an object) can be estimated. The one or more unknown optical path lengths may describe or represent the state of one or more transducers (e.g., a cantilever or a torsion bar).

In some embodiments, the method can include inducing a relative translation between the object and a probe beam. For example, the relative translation may provide for range measurements to multiple points on the surface of an object, and when aggregated, these range measurements may provide a three-dimensional surface profile measurement of the object. Alternatively, the relative translation may provide for optical path length measurements for various transmission paths through an object. Still yet, in some embodiments, the method can include generating the signal representing spectral interference fringes using a detector array (e.g., a CCD array or a CMOS camera). For example, each pixel on the camera may provide a unique set of spectral interference fringes representing the range to points on an object or the optical path lengths of paths through an object.

Some embodiments provide for a method that includes observing and recording spectral interference fringes as a function of angle incident onto the object and diffracted angle from the object. Then, the object may be tomographically reconstructed using amplitude and phase of the spectral interference fringes. In some embodiments, the spectral interference fringes can be observed sequentially by moving a detector and/or rotating the object. In other embodiments, a multiplicity of incident and diffracted angles each having unique optical path lengths can be observed and recorded substantially simultaneously. Then, using a temporal filtering, a signal corresponding to each incident and diffracted angle can be distinguished.

Various embodiments of the present invention also include computer-readable storage media containing sets of instructions to cause one or more processors to perform the methods, variations of the methods, and other operations described herein.

Various embodiments can provide for a time-domain multiplexed imaging system. The system can include a source, a first network, a second network, an observing means, and/or a filtering module. The source can be configured to emit multiple frequencies of electromagnetic radiation. These multiple frequencies can change with time in some embodiments. In other embodiments, the electromagnetic radiation could be a broadband electromagnetic radiation containing multiple frequencies. The first network can be coupled to the source to divide the electromagnetic radiation into a reference path and two or more test paths having different optical path lengths. The electromagnetic radiation traversing the two or more test paths can interact with disparate locations on an object. The second network may be configured to recombine the two or more test paths with the reference path. Then, the observing means can be used to observe spectral interference fringes from the second network that recombined the two or more test paths with the reference path. The filtering module may be used to generate spectral signals corresponding to different test paths by filtering the spectral interference fringes.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
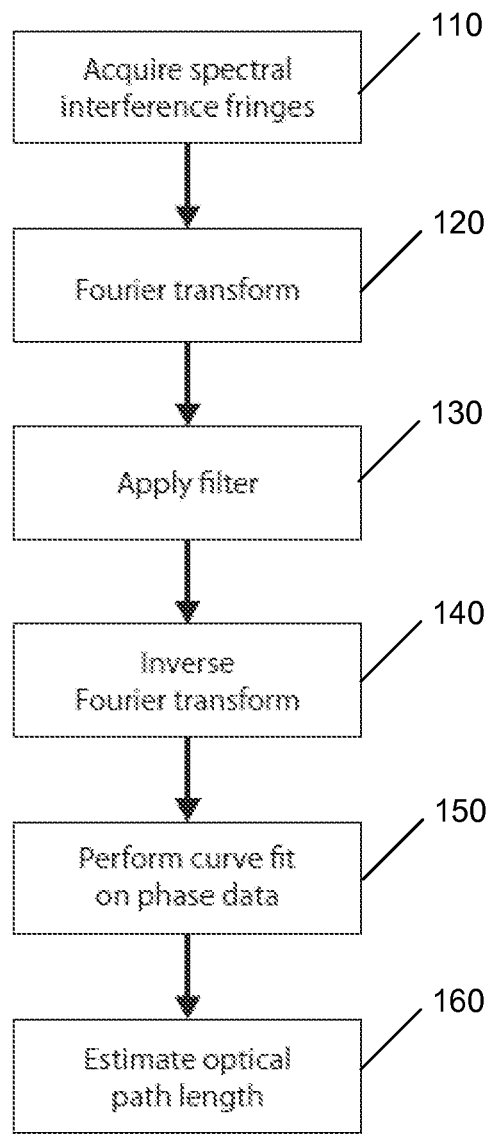
FIG. 1 is a flowchart illustrating an exemplary set of operations for estimating optical path length using spectral phase analysis in accordance with one or more embodiments of the present invention.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention relate generally to interferometry. More specifically, embodiments of the present invention relate to spectral and swept-wavelength interferometry for both absolute and relative optical path length measurements. Some embodiments of the present invention provide a novel implementation of phase-sensitive frequency-domain interferometry wherein phase information is used to perform measurements of optical path lengths and thicknesses spanning multiple resolution-limited depth bins to sub-nanometer precision. Some embodiments of the present invention also provide accurate calibration of the time or spatial domain sampling grid, thereby producing highly accurate optical path length measurements.

Frequency-domain interferometry is a technique whereby electromagnetic (EM) radiation emanating from a source is split into two or more components that traverse different paths before being recombined prior to detection. At the detector, interference fringes are observed as a function of the frequency or wavelength of the electromagnetic radiation. Two primary methods for performing frequency domain interferometry exist. The first, called swept-wavelength interferometry, utilizes a coherent source of EM radiation, such as a laser, that emits a narrow spectrum of frequencies at any one instant (narrow enough to be considered monochromatic), but the center or mean output frequency may be changed in time. When such a source is used, interference fringes are observed in time as the frequency output by the source is varied. The second method, called spectral-domain interferometry, utilizes a broadband, incoherent source of EM radiation, such as a lamp, superluminescent diode, or supercontinuum source, that emits a broad range of frequencies simultaneously. When such a source is used, interference fringes may be observed as function of frequency using a spectrometer, which may detect frequencies sequentially, such as with a monochrometer, or simultaneously, such as with a dispersive element coupled with a detector array.

In both swept-wavelength interferometry and spectral domain interferometry, the interference fringes that are observed can be construed to be a variation of detected irradiance as a function of the frequency of the EM radiation. As such, the interference fringes in both methods can be referred to as spectral interference fringes to distinguish them from interference fringes formed in other types of interferometry where the detected irradiance varies as a function of some other variable, such as a spatial coordinate. Furthermore, as swept-wavelength interferometry and spectral-domain interferometry both produce spectral interference fringes, both methods can be classified as frequency-domain interferometry methods. More generally, the term frequency-domain interferometry refers to any method of interferometry capable of producing spectral interference fringes.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in one embodiment," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may", "can", "could", or "might" be included or have a characteristic, that particular component or feature is not required to be included or have the characteristic.

The term "responsive" includes completely and partially responsive.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

General Description

Various embodiments of the present invention represent a novel utilization of spectral phase information for improving the precision of optical path length measurements performed using spectral interferometry through the method of spectral phase analysis (SPA). FIG. 1 illustrates an exemplary set of operations involved in one embodiment of SPA. As illustrated in FIG. 1, acquisition operation 110 acquires (e.g., detects, records, and/or transmits) spectral interference fringes. In some embodiments, for example, a swept-wavelength interferometry system or a spectral-domain interferometry system may be used to acquire the spectral interference fringes. In some embodiments, acquisition operation 110 can produce a digital data set representing the spectral interference fringes.

Transformation operation 120 applies a Fourier transform to the spectral interference fringe data set to produce a temporal (A-scan) data set. Filtering operation 130, applies a filter to the temporal data set. In some embodiments, filtering operation 130 may use a windowing function with one or more pass bands aligned to delays of interest in the temporal data set. In some cases, filtering operation 130 can produce one or more filtered temporal data sets. Inversion operation 140 applies one or more inverse Fourier Transforms to the one or more filtered temporal data sets to produce one or more complex spectral data sets.

Extraction operation 150 extracts the phase of one or more of the complex data sets to produce one or more spectral phase data sets. Then, one or more curve fits are applied to the spectral phase data sets. Estimation operation 160 uses the one or more parameters of the curve fit, for example one or more polynomial coefficients if the curve fit is to a polynomial function, to aid in the estimation of one or more optical path lengths. In some embodiments, an optical path length refers to the product of refractive index and physical length or the product of the square root of the dielectric constant and the physical length. In some embodiments, optical path length may be represented in units of length, whereas in other embodiments optical path length may be represented in units of time, in which case the optical path length is equivalent to group delay. The length and time representations of optical path length are related via a factor equal to the speed of light. In accordance with various embodiments, measurements of optical path length are not limited to the optical portion of the electromagnetic spectrum.

Figure 2:
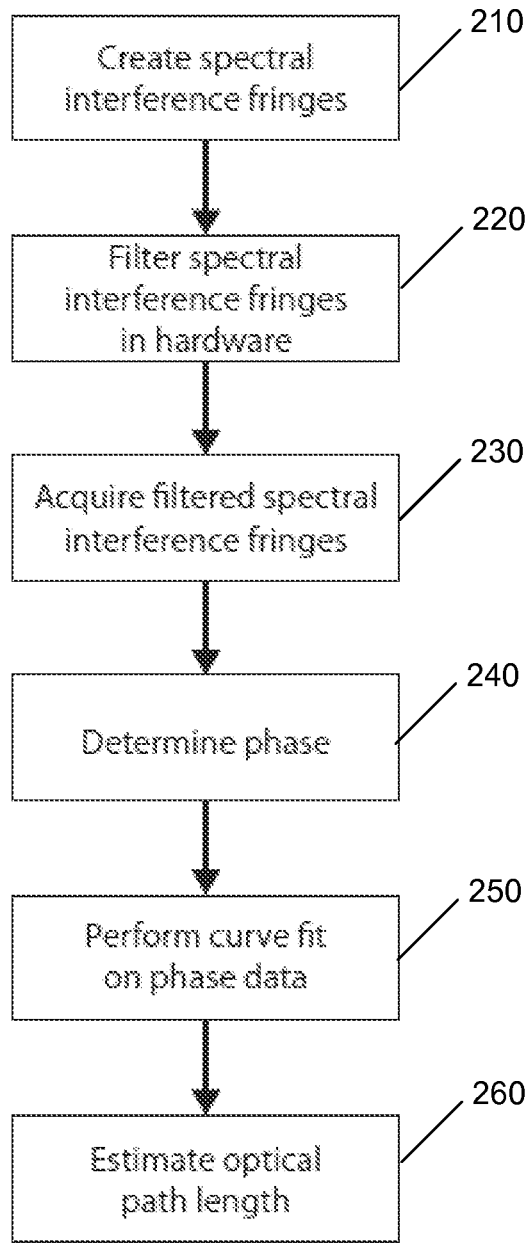
FIG. 2 is a flowchart illustrating an exemplary set of operations for estimating optical path length using spectral phase analysis in accordance with various embodiments of the present invention.

FIG. 2 illustrates a set of exemplary operations in an alternative embodiment of SPA. In FIG. 2, creation operation 210 generates spectral interference fringes. This can be done, for example, using a swept-wavelength interferometry system or a spectral domain interferometry system. The spectral interference fringes may exist as an optical or electronic signal and/or as recorded or digitized data sets. Filtering operation 220 applies one or more hardware filters to the spectral interference fringes. One example of such hardware filtering may be the use of electronic bandpass filters coupled to the detection circuitry in a swept-wavelength interferometry system. Another example of such hardware filtering includes the use of Fourier transform lenses and optical spatial filtering in a spectral-domain interferometry system.

Acquisition operation 230 acquires one or more sets of filtered spectral interference fringes. In some embodiments, the filtered spectral interference fringes are detected and a digital data set representing the filtered spectral interference fringes is recorded producing one or more spectral interference fringe data sets. Determination operation 240 determines the phase of one or more spectral interference fringe data sets. As a result, one or more spectral phase data sets may be created. Examples of methods that can be used in accordance with some embodiments to determine the phase of the spectral interference fringe data sets include Fourier filtering and use of a Hilbert transform. Fitting operation 250 applies one or more curve fits to one or more of the spectral phase data sets. Estimation operation 260 estimates one or more optical path lengths using parameters generated by fitting operation 250. For example, one or more polynomial coefficients could be used if the fitting operation utilizes a polynomial function to estimate the phase.

In various embodiments, phase-sensitive swept-source optical coherent tomography (SS-OCT), an implementation of swept-wavelength interferometry, is used in conjunction with SPA for measurements of optical path lengths associated with optical reflections from reflecting objects and interfaces. As an application of this embodiment, simultaneous measurements of group refractive index and physical thickness of optical samples are performed. In other embodiments, spectral-domain (SD-) OCT, an implementation of spectral-domain interferometry, may be employed in place of SS-OCT. Though others have performed similar measurements using low-coherence interferometry in both the time domain and spectral domain, embodiments of the present invention represent the first swept-wavelength demonstration of simultaneous group index and thickness measurement, as well as the first novel utilization of SPA for improved measurement performance in conjunction with either swept-wavelength interferometry or spectral domain interferometry. The use of phase-sensitive self-referenced frequency domain interferometry provides resolution improvements of up to two orders of magnitude for both group index and thickness measurements over traditional techniques.

In SS-OCT, each A-scan performs an axial reflectivity measurement using swept-wavelength interferometry, also known as optical frequency domain reflectometry (OFDR), which in turn is based on swept-wavelength interferometry. In this technique, the output of a wavelength-tunable source is split into a fixed-length reference path and a sample path, which are then recombined allowing the light traversing each path to interfere prior to detection. As the source optical frequency is swept over a range $\Delta v$ about a central frequency $v_0$, a fringe pattern is observed at the interferometer output. The frequency of the fringe pattern indicates the differential group delay between the reference path and the sample path. This differential group delay is a measure of the differential optical path length between the reference path and the sample path. For a sample with M distinct reflectors distributed axially, the oscillating portion of the photodetector voltage at the interferometer output is $$U(v) = 2U_0 \sum_{i=1}^{M} |r_i| \cos(2\pi v \tau_i + \xi_i) \quad (1)$$

where $v$ is the instantaneous frequency of the laser source, $\tau_i$ is the group delay difference between the $i^{th}$ reflection in the sample path and the reference path, and $\xi_i$ is a constant phase offset. The factor $r_i$ is the effective reflection coefficient of the $i^{th}$ reflection.

In an alternative embodiment, SD-OCT is used to perform A-scans using spectral-domain interferometry. In this case, the spectral interference fringe pattern described by Eq. 1 is not an oscillating photodector signal, but rather the output signal of a spectrometer.

To avoid limitations in the axial resolution of the scan due to nonlinearity of the optical frequency sweep in swept-wavelength embodiments, frequency calibration or frequency monitoring of the source may be employed. In some embodiments, this can be accomplished using an auxiliary interferometer in several ways. One way is to use the auxiliary interferometer output signal to provide instantaneous frequency data throughout the sweep in order to resample the interferogram onto a grid of equal optical frequency increments; a second way is to use the instantaneous frequency data to perform a non-uniformly sampled discrete Fourier transform; a third way is by using the auxiliary interferometer output as a frequency clock to trigger acquisition of the fringe pattern data. In other embodiments, the frequency sweep of the source may be pre-calibrated; in still other embodiments a frequency clock signal may be provided by electronics such as an field programmable gate array (FPGA) coupled to the source; in still other embodiments the frequency sweep may be sufficiently linear such that frequency calibration or monitoring is not required.

In embodiments utilizing spectral-domain interferometry, an auxiliary interferometer may also be used to calibrate the spectrometer, or other means may be used to calibrate the spectrometer. In both types of embodiments, a calibrated frequency sampling allows the sampled frequency-domain fringe pattern data to be converted to the time domain via a Fourier transform. In the case of equal frequency sampling intervals, the Fourier transform may be accomplished using a discrete Fourier transform algorithm such as the fast Fourier transform algorithm (FFT). Alternatively, for unequal frequency sampling intervals, a non-uniformly sampled discrete Fourier transform algorithm may be used. For either frequency sampling case, the result of the Fourier transform may be an equally or unequally sampled time domain data set. In the time domain, the contribution $\tilde{U}_i(\tau)$ due to the $i^{th}$ reflector is $$U_i(\tau) = U_0 |r_i| \Delta v \, \text{sinc} \, [\Delta v(\tau - \tau_i)] e^{-j(2\pi v_0 \tau - \psi_i)} \quad (2)$$

where $\psi_i = \xi_i + 2\pi v_0 \tau_i$ and sinc $(x) = \sin(\pi x)/(\pi x)$. Here the sinc function arises due to the assumption of a constant amplitude over the spectral range $\Delta v$. Other spectral shapes (or the application of a windowing function prior to the Fourier transform) will change the shape of the time domain response. The width $\Delta \tau_w$ of this response function determines the axial resolution of an A-scan, and this width will generally be $\Delta \tau_w \approx 1/\Delta v$ for most spectra. Note also that $\delta \tau = 1/\Delta v$ will be the sample spacing of the time domain data when an FFT is used, so that in the best case the axial resolution will be equivalent to one temporal bin. If there are two reflectors spaced by $\delta \tau$ or less, they may not be resolvable. For an isolated reflector, however, the location of the reflector, described by $\tau_i$, can be determined to within a small fraction of δτ by analyzing the phase of the reflector's contribution to the time domain reflectogram.

Spectral Phase Analysis For Improved Range Precision

Figure 3A:
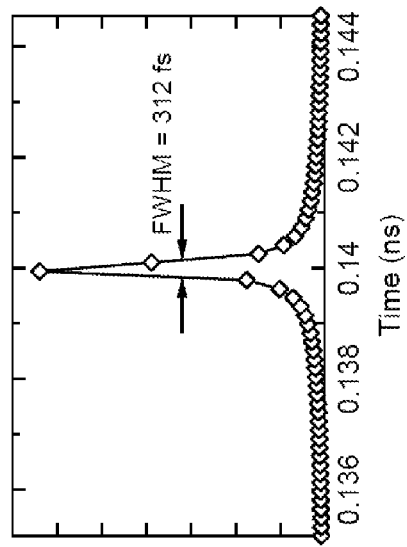
FIGS. 3A-3D shows simulated data for various steps in the spectral phase analysis method for precision optical path length measurements in accordance with some embodiments of the present invention.

A coarse measurement of $\tau_i$ may be accomplished by noting the location $\tau_{i,q}$ of the $i^{th}$ peak in the time domain data array. A measurement of $\tau_i$ with improved precision may be accomplished using the method of spectral phase analysis (SPA). Data processing steps associated with various embodiments of SPA are illustrated in FIGS. 1-2. An example of time domain data for a single A-scan is plotted in FIG. 3A for a single isolated reflector. FIG. 3A depicts simulated A-scan data for a single reflector at a relative group delay of exactly $\tau_0$=0.14 ns, corresponding to a path length difference between the reference and sample arms of approximately 4.2 cm. Both the positive- (+) and aliased negative-delay (−) peaks are shown. In other embodiments or applications of this embodiment, the A-scan data may contain distributed reflection data or contributions from multiple paths that manifest as multiple peaks in the time domain data set.

The precision of this coarse determination of the reflector position is δτ, or one temporal bin. The true value of $\tau_i$ is likely to lie between sampled points. This offset between the location of the peak value in the time domain data array and the true value of $\tau_i$ can be found by applying the shift theorem of Fourier transforms to a subset of time domain data surrounding the $i^{th}$ peak. The shift theorem states that a translation in the time domain is accompanied by a corresponding linear phase factor in the frequency domain. Thus, determination of the offset between the value of $\tau_i$ and the $i^{th}$ peak location can be accomplished through a linear phase measurement in the frequency domain.

Figure 3B:
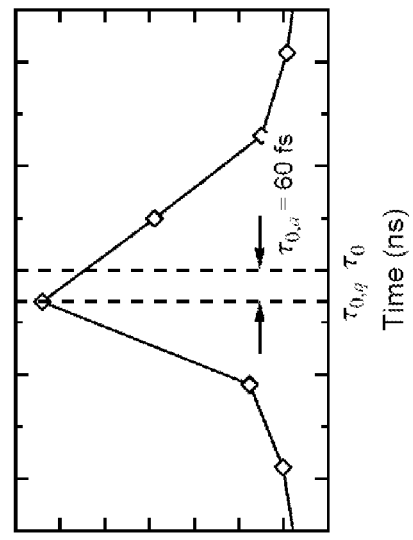

For an isolated reflection peak, the corresponding phase contribution in the frequency domain can be found by windowing out the single peak using a filter and then performing an inverse Fourier transform on the windowed data subset. In some embodiments, the filter may be a digital filter or window applied to a digitized time domain data set. In other embodiments, the filter may be applied via convolution to a digitized frequency domain data set. In still other embodiments, the filter may be applied in hardware prior to observation or recording of the spectral interference fringe pattern, for example by using one or more electronic bandpass filters. FIG. 3B is a plot of the amplitude of the windowed reflection peak selected by applying a digital filter to the positive delay peak in FIG. 3A. As illustrated in FIG. 3B, the digitally filtered reflection peak has a maximum value located at $\tau_{0,q}$=0.13994 ns, yielding an error in the axial location of 9.0 μm in air. In this embodiment, a single filter window is applied, though other embodiments may incorporate filters with one or more pass bands of various shapes.

Figure 3C:
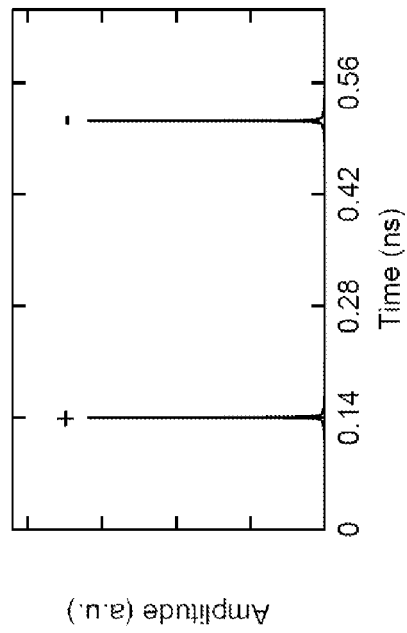

The phase of the resulting frequency domain data set will wrap rapidly between 0 and 2π, which may cause difficulties in applying a curve fit. One way to facilitate curve fitting is to unwrap the phase. The phase may be more easily unwrapped if the time domain subset is rotated such that the amplitude maximum occupies the first (DC) index location in the data array. Performing this rotation prior to the inverse Fourier transform results in a slowly-varying frequency domain phase that can be straightforwardly unwrapped. Fitting a line to the unwrapped phase φ(ν), as shown in FIG. 3C, gives a slope $$\frac{1}{2\pi}\frac{d\phi}{d\nu} = \tau_{i,a} \quad (3)$$

that represents a fine adjustment to the coarse measurement $\tau_{i,q}$. In other embodiments of SPA, the preferred function for curve fitting the frequency domain phase may be a function other than a line. For example, if the EM radiation propagates through a medium with significant dispersion, a curve fit to a polynomial of order two or greater may be preferred. For curve fit functions other than a line, a linear component or average slope may be used to aid the optical path length determination, or may aid in the determination of a mean or average optical path length.

Figure 3D:
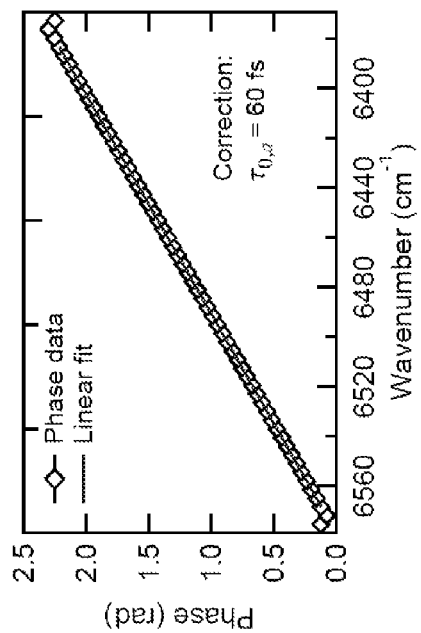

Prior to the inverse Fourier transform, a Hanning window can be applied to reduce truncation effects and the peak was shifted to the DC location in the data array. Application of the Hanning window may be useful but is not required, and other window functions may be preferable in other embodiments or applications. The linear fit excluded data points at the extremities due to residual truncation effects. The resulting slope of the linear fit corresponds to a group delay correction of $\tau_{0,a}$=0.00006 ns, which is the precise correction needed to recover the exact value of $\tau_0$=0.14 ns as shown in FIG. 3D.

The precision of the resulting measurement of the reflector position given by $\tau_i = \tau_{i,q} + \tau_{i,a}$ as determined by the standard deviation over multiple measurements may be limited by a variety of factors, including the repeatability of the wavelength sweep as well as drift of the interferometer with changes in environmental conditions. Because measurement errors due to sweep-to-sweep variations in the optical source will be correlated for multiple reflections within a single A-scan, measurement precision can be significantly improved by performing a relative group delay measurement using one reflector within the A-scan as a reference. For embodiments incorporating optical fiber systems with a free space probe, the fiber end facet in the sample arm makes a convenient reference reflector. In other embodiments, the reference may take on another form, such as a mirror or a transmissive path.

Sampling Grid Calibration for Accurate Absolute Ranging

The accuracy with which a reflector can be located depends not only on the precision of the group delay measurement, but also the accuracy of the time domain sampling grid that is used to perform the coarse group delay measurement, $\tau_{i,q}$. Because of the discrete Fourier transform relationship between the acquired frequency domain fringe pattern and the time domain A-scan, the range of the A-scan is given by the reciprocal of the frequency domain step size, δν. For an N-point A-scan, the time domain step size is therefore δτ= $(N\delta\nu)^{-1}$. As mentioned above, the fringe pattern may be sampled on a grid of equal frequency increments, either through the use of a frequency clock to trigger data acquisition or by monitoring the instantaneous frequency of the source throughout a sweep and resampling the fringe data in post-processing. Thus, for swept-wavelength embodiments, the uncertainty in the time domain step size depends on the accuracy with which the instantaneous optical frequency can be determined during a wavelength sweep. For embodiments utilizing spectral-domain interferometry, the uncertainty in the time domain step size depends on the calibration accuracy of the spectrometer.

One way to monitor the instantaneous optical frequency of a swept source is through the use of an auxiliary interferometer. Provided that the differential group delay Δτ between the auxiliary interferometer paths and the mean laser sweep rate γ=dν/dt are chosen such that $\Delta\tau_2\gamma \ll 1$, then the output spectral interference fringe pattern will be a periodic function of optical frequency with a period of 1/Δτ. If the fringe data is sampled or resampled at this period so that the frequency domain step size δτ is equal to 1/Δτ, then Δτ will be the full range of the dual-sided time domain data set, and the Nyquist-limited measurable group delay will be $\Delta\tau/2$.

The accuracy of the time and frequency domain sampling grids then depend on the accuracy with which $\Delta\tau$ (or its reciprocal) can be measured. Note that once $\Delta\tau$ has been determined, the uncertainty in the time domain step size $\delta\tau=\Delta\tau/N$ does not follow a normal distribution from point to point throughout the time domain data set. Rather, an error in the measurement of the trigger delay yields a single value of $\delta\tau$ that may be either too small or too large by the same relative magnitude as the error in $\Delta\tau$. Therefore, an optical path length measurement with a measured delay $\tau_i$ performed by locating a peak at a fractional index k in the time domain data array will have an uncertainty given by $$u(\tau_{i,q}) = ku(\delta\tau) = \frac{k}{N}u(\Delta\tau), \qquad (4)$$

where u(x) is used to denote the uncertainty in the quantity x. Thus, the relative error in the range measurement will equal the relative error in the calibration of the auxiliary interferometer.

One way to precisely calibrate the auxiliary interferometer is by counting the number of fringe periods between well-characterized spectral features, such as molecular absorption lines. Wavelength references based on molecular absorption lines can be accurate to ±0.01 pm, and commercial gas cells with wavelength accuracies as good as ±0.05 pm are available in multiple spectral bands. These specifications yield a known uncertainty between two spectral features that span a frequency range $\Delta v_c$. For a given auxiliary interferometer with a differential group delay $\Delta\tau$, the number of periods over the range $\Delta v_c$ will be $m=\Delta v_c\Delta\tau$. Using this relationship to determine $\Delta\tau$, there will be contributions to the uncertainty due to the quality of the wavelength reference $u(\Delta v_c)$, as well an uncertainty in the determination of m to a fraction of a fringe. Therefore, the total uncertainty in $\Delta\tau$ is $$u(\Delta\tau) = u\left(\frac{m}{\Delta v_c}\right) = \frac{m}{\Delta v_c}\left[\left(\frac{u(m)}{m}\right)^2 + \left(\frac{u(\Delta v_c)}{\Delta v_c}\right)^2\right]^{\frac{1}{2}}. \qquad (5)$$

Figure 4:
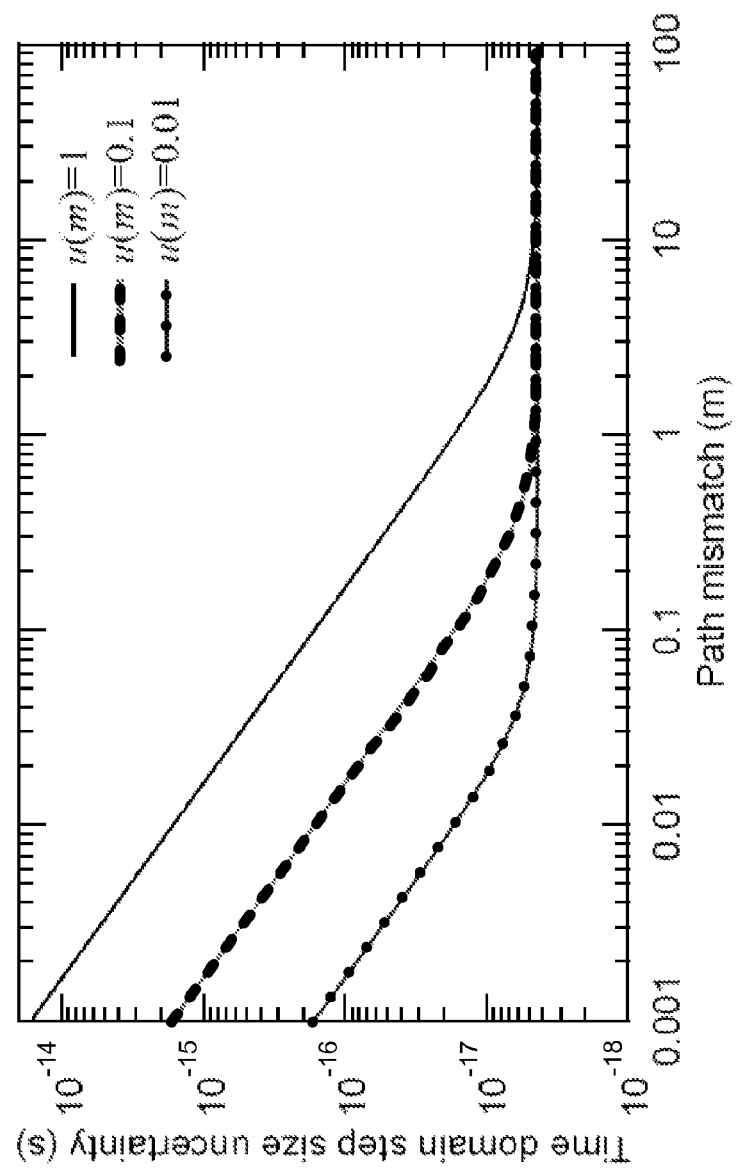
FIG. 4 depicts uncertainty in the time domain sampling grid as a function of path length difference for an interferometer calibrated using the R20 and P20 absorption lines of a 100-Torr $H^{13}CN$ wavelength reference according to one embodiment of the present invention.

When such an interferometer is used to trigger data acquisition during a frequency sweep over a range $\Delta v$, the number of samples N will be $N=\Delta v\Delta\tau$, and the uncertainty in the time domain step size will be $u(\delta\tau)=u(\Delta\tau)/N$. FIG. 4 is a plot of $u(\delta\tau)$ for some representative values over a range of interferometer path imbalances from 100 µm to 100 m. This range covers typical SS-OCT systems designed for imaging applications on the short end, and typical OFDR systems designed for fiber sensing and telecommunications system testing on the upper end. The frequency sweep range is $\Delta v_c=3.49$ THz, corresponding to the spectral separation between the R20 and P20 absorption lines of $H^{13}CN$ at 100 Torr, a common wavelength reference material for the range between 1528 and 1562 nm. Other wavelength reference materials may be used in conjunction with embodiments of the invention operating over other spectral ranges. The R20 and P20 lines are located at 1530.3061 nm and 1558.0329 nm, respectively, and the uncertainty in their location is ±0.3 pm for this exemplary wavelength reference artifact.

FIG. 4 depicts uncertainty in the A-scan sampling grid as a function of path length difference for an interferometer calibrated using the R20 and P20 absorption lines of a 100-Torr $H^{13}CN$ wavelength reference. The three curves correspond to fringe counting uncertainties of 1, 0.1, and 0.01. The asymptotic value of 4.4 as is reached when the uncertainty of the wavelength reference dominates. Interestingly, this plot shows that an extremely high degree of temporal accuracy can be achieved over a range of interferometer length imbalances spanning several orders of magnitude. For short interferometers, such as those typically used for SS-OCT, accurately determining the number of periods between the absorption lines to a fraction of a fringe improves temporal accuracy. This may be accomplished by fitting a Lorentzian curve to the sampled absorption line data. For longer interferometers, high temporal accuracy can be achieved without the need for fractional fringe counting.

Experimental Results and Discussion

Figure 5:
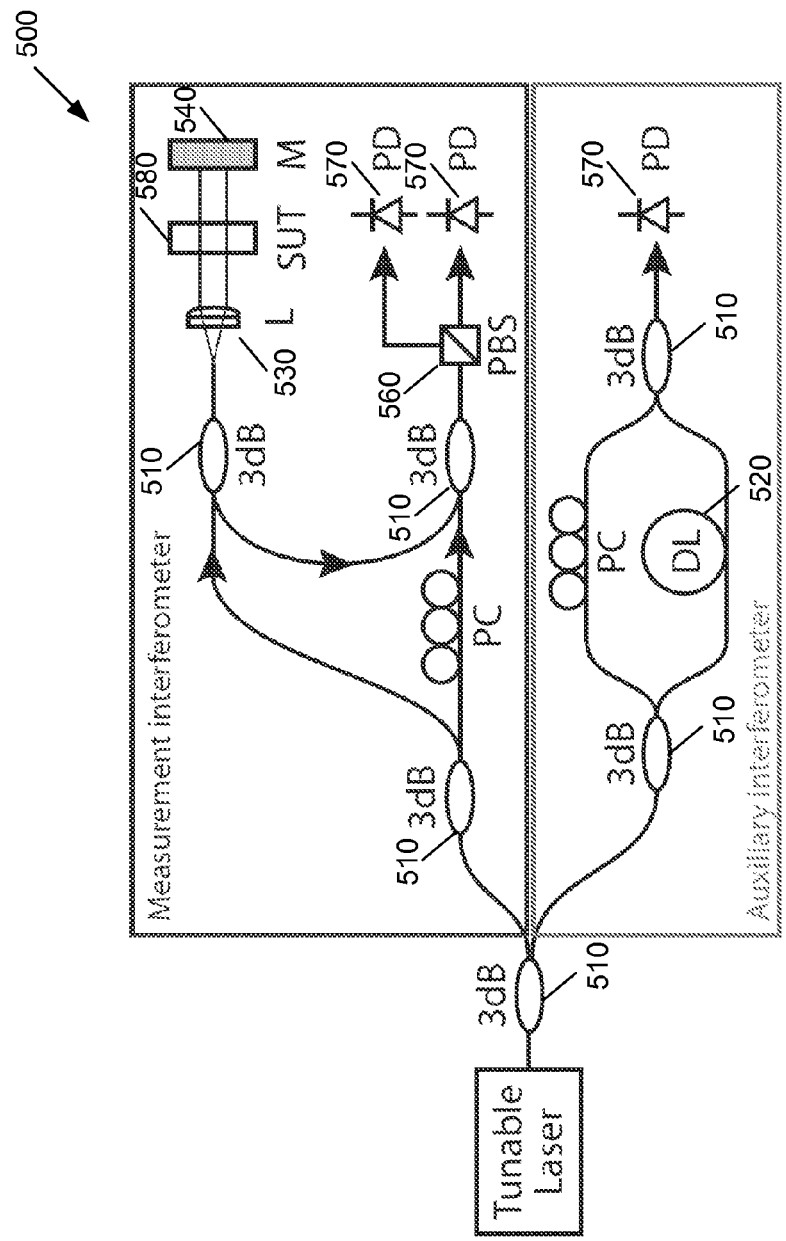
FIG. 5 is a schematic illustration depicting the architecture of a swept-wavelength interferometry system for performing refractive index and thickness measurements using SPA according to some embodiments of the present invention.

FIG. 5 depicts a schematic diagram 500 of a swept-wavelength interferometry system 500 having the flowing components: 3 dB, 3 dB fiber coupler; 510 DL, fiber delay line 520; L, collimation lens 530; M, mirror 540; PC, polarization controller 550; PBS, polarization beam splitter 560; PD, photodetector 570; and SUT, sample under test 580. FIG. 5 illustrates one embodiment of the present invention using a fiber optic implementation, but other embodiments including free-space, fiber, waveguide, and hybrid systems may be used. The interferometer design utilizes a transmissive reference path and a reflective measurement path, however those skilled in the art will recognize that the reference and measurement paths may be either reflective or transmissive, and that each of the reference and measurement paths may include multiple paths, including both reflective and transmissive paths. In accordance with various embodiments, the interferometer geometry may be a Mach-Zehnder geometry, a Michelson geometry, a Fabry-Perot geometry, or other geometry.

As illustrated in FIG. 5, the spectral interference fringes are detected using a pair of photodetectors 570 configured in a polarization-diverse detection scheme. Alternatively, a single detector may be used, or multiple detectors may be configured for differential detection or a combination of differential and polarization-diverse detection. For embodiments incorporating multiple reference paths, each reference path may utilize a different detector or set of detectors. An auxiliary interferometer may be implemented using a Mach-Zehnder geometry, though other geometries such as a Michelson geometry may be used.

In some embodiments, the auxiliary interferometer can be calibrated using the R20 and P20 absorption lines of a 100 Torr $H^{13}CN$ gas cell (dBm Optics model WA-1528-1562). The absorption spectrum of the gas cell was acquired using the auxiliary interferometer to trigger data acquisition. The number of samples between the R20 and P20 absorption lines was determined to a fraction of a sample by curve fitting the absorption lines to precisely locate their minima. In this process, the uncertainty of the absorption line wavelengths (known to ±0.3 pm) dominates the interferometer calibration error. The resulting measurement yielded a group delay difference between the two paths of the auxiliary interferometer of $\Delta\tau=63.9413\pm0.0012$ ns.

In this embodiment, the AC-coupled output of this interferometer can be used as an analog clock to trigger data acquisition on the polarization-diverse outputs of the measurement interferometer using a National Instruments PCI-6115 data acquisition card. The tunable laser was an Agilent 81680A with a maximum sweep rate of 40 nm/s. Measurements can be performed by sweeping the laser from 1500 to 1564.17 nm. This sweep range coupled with the frequency domain step size of $1/\Delta\tau=15.6395$ MHz yields A-scans comprising 524,288 data points. Other embodiments may employ other optical sources, other methods of frequency monitoring, other means for recording and/or processing the spectral interference fringes, different spectral ranges, and different data set sizes.

Figure 6:
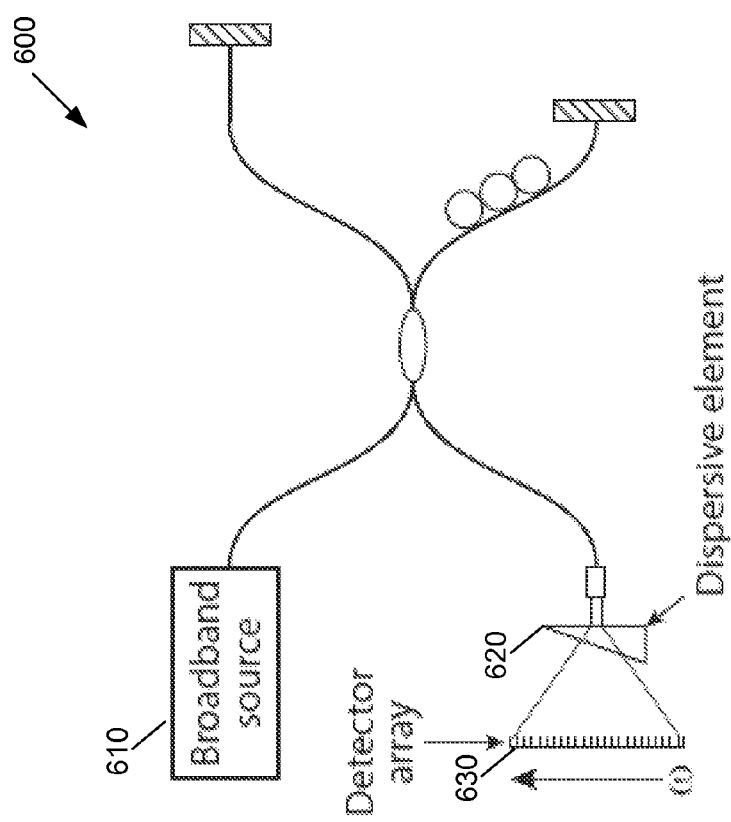
FIG. 6 is a schematic illustration depicting the architecture of a system for performing precise optical path length measurements using SPA according to various embodiments displaying a spectral-domain interferometry implementation.

An example of a spectral-domain interferometry system 600 used to implement a second exemplary embodiment of the invention is shown in FIG. 6. This approach utilizes a broadband source of EM radiation 610 with a constant output spectrum rather than a coherent swept-frequency source. As before, the interferometer may take on a variety of geometries, including both fiber and free-space implementations, with a fiber Michelson interferometer being shown. At the output, a dispersive component 620 spreads the output spectrum across a detector array 630, such as a linear CCD array or CMOS camera. In such a configuration, each element of the detector array 630 maps to a specific frequency value within a range of frequencies spanned by some or all of the source spectrum. Interference fringes are observed spatially as a function of the radiation frequency across the detector array. Alternatively, the spectral interference fringes may be observed sequentially, for example with a Czerny-Turner monochromator or other type of monochromator.

Once interference fringes are acquired as a function of the radiation frequency, the same processing steps outlined above for improving the precision of optical path length measurements in context of swept-wavelength interferometry may be applied to spectral-domain interferometry data, resulting in extremely precise measurements of optical path length for isolated paths. The choice of a swept-wavelength interferometry or spectral-domain interferometry implementation depends on a variety of factors, and the preferred choice will depend on the specific requirements of particular applications. Because both the resolution of the system and the precision achievable by SPA depend on the total spectral bandwidth of the source, spectral-domain interferometry is currently capable of achieving better resolution and precision because broadband sources are currently available with larger bandwidths than swept-frequency sources.

On the other hand, swept-wavelength systems can achieve much denser sampling in the spectral domain through the use of high speed data acquisition hardware, whereas spectral-domain systems are limited in sampling density by the number of elements in the detector array or the resolution of the monochromator. While swept-wavelength systems routinely achieve a million or more samples across the frequency spectrum of the source, spectral-domain systems are generally limited to a few thousand samples or less. The increase in frequency sampling density with swept-wavelength systems means that the total measurable path length is greater by a factor equal to the ratio of sampling densities. In terms of practical implementation, spectral-domain systems require more careful path matching between the interferometer arms due to the low coherence of the source, whereas the high coherence of many swept-frequency sources greatly relax the path matching requirements.

As an exemplary application of highly precise optical range measurements, simultaneous measurements of group refractive index and physical thickness of an optical sample may be performed. A parallel fused silica plate with a nominal thickness of 3 mm may be used as the sample under test (SUT). A reference mirror may be positioned behind the SUT. To minimize scan-to-scan drift in the position of the reference mirror, the entire system may be enclosed and the test plate may be mounted on a motorized translation stage so it can be inserted into and removed from the measurement path without opening the enclosure.

Figure 7:
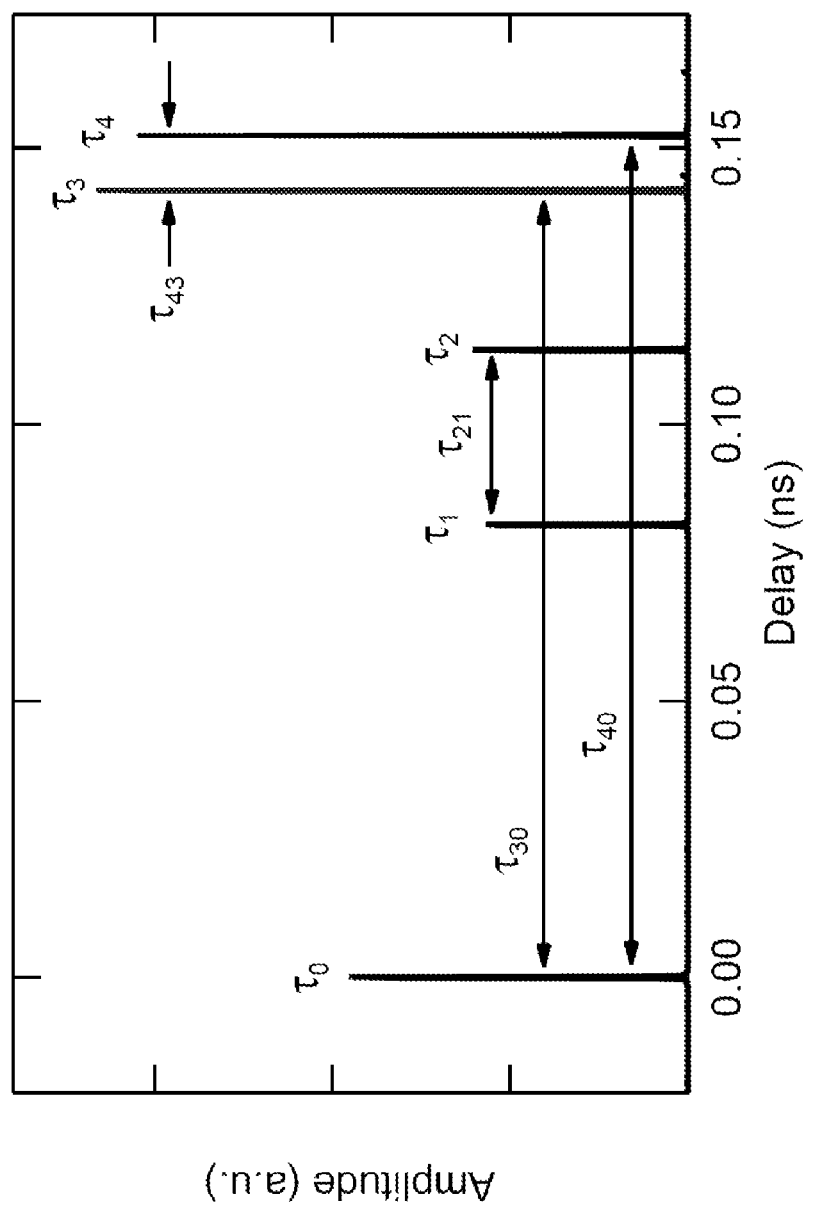
FIG. 7 shows exemplary time domain data obtained using one or more embodiments of the present invention.

FIG. 7 depicts A-scans with and without ($\tau_3$) the fused silica test plate in place. The reflection peaks correspond to the fiber end facet ($\tau_0$), the front ($\tau_1$) and rear ($\tau_2$) of the fused silica test plate, and the reference mirror ($\tau_3$ and $\tau_4$). Zero delay has been defined to correspond with the fiber end facet. The physical thickness T of the plate is determined from relative group delay measurements (i.e., optical path length measurements) according to $$T = \frac{c}{n_g} \frac{\tau_{21}}{2} \tag{6}$$

where c is the speed of light in vacuum and $n_g$ is the group index of the SUT, which is found using $$n_g = \frac{\tau_{21}}{\tau_{21} - \tau_{43}} n_{g,air}. \tag{7}$$

Refer to FIG. 7 for the definitions of $t_{21}$ and $t_{43}$. Various models known to those of ordinary skill in the art may be used to determine the group refractive index of air at the center sweep wavelength for the present atmospheric conditions, $10^6(n_{g,air}-1)=2184\pm1$, in this example. The value of $t_{21}$ is found directly in a single scan, so noise due to environmental fluctuations and scan-to-scan variations in the laser sweep cancel. Determination of $t_{43}$ requires two A-scans, one with the SUT present and one without. By referencing the mirror range measurement to the reflection from the fiber end facet ($t_0$ in FIG. 4), scan-to-scan variations largely cancel, and the measurement noise of $t_{43}$ approaches that of $t_{21}$.

Figure 8:
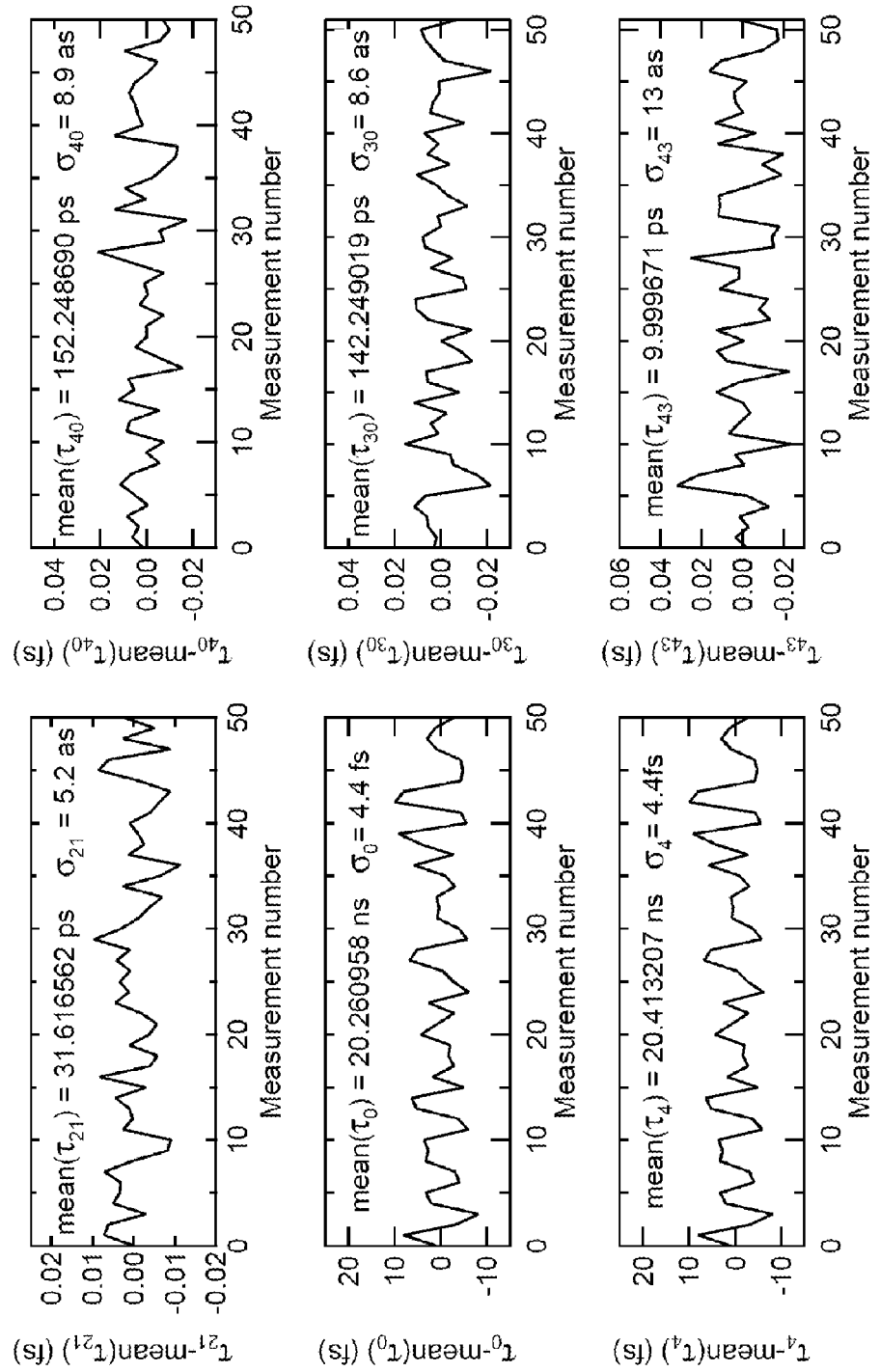
FIG. 8 illustrates an exemplary optical path length measurement precision demonstrated in accordance with various embodiments of the present invention.

To illustrate the level of measurement noise in each group delay measurement, plots of 50 repeated measurements of referenced and unreferenced group delays defined in FIG. 7 are shown in FIG. 8. The standard deviation of unreferenced group delay measurements was 4.4 femtoseconds, whereas the standard deviations of self-referenced group delay measurements were as small as 5.2 attoseconds for $t_{21}$, where the relative measurement involved two facets of a single glass plate. This value corresponds to a distance of 780 picometers in air.

Using the measurement data shown in FIG. 8, the group refractive index of the fused silica plate to be 1.462905±0.000002 can be determined. The uncertainty in this measurement includes the standard deviation of $t_{21}$ shown in FIG. 8, as well as an increased uncertainty in $t_{43}$ due to drift in the position of the reference mirror during the process of inserting or removing the fused silica test plate. The uncertainty can be estimated to be a factor of 2 greater than the standard deviation based on the repeated measurements of $t_{40}$ and $t_{30}$ shown in FIG. 8. Because the group index measurement is a relative measurement (apparent from Equation (7)), the value of the time domain step size falls out of the measurement and does not affect the final uncertainty.

The thickness of the test plate found using Equation (6) was 3.239584 mm±61 nm. This is in good agreement with the value of 3.240±0.001 mm found by measuring the thickness of the test plate using a mechanical micrometer. The uncertainty in the interferometric thickness measurement is dominated by the uncertainty in the calibration of the relative group delay of the auxiliary interferometer, which results in an uncertainty in the time domain step size of u($\delta\tau$)=2.3 as. Because $t_{21}$ is determined by the sum of an integer number of time domain samples and an adjustment of a fraction of a sample determined by the phase slope, the total uncertainty in the absolute determination of $t_{21}$ is given by $$u(\tau_{21}) = \left\{ \left[ \text{int}\left(\frac{\tau_{21}}{\Delta\tau}N\right)u(\delta\tau) \right]^2 + \sigma_{21}^2 \right\}^{\frac{1}{2}}, \quad (8)$$

where the function int( ) denotes rounding to the nearest integer. For macroscopic thicknesses, the uncertainty in the time domain step size dominates, and the total uncertainty can be approximated as $$u(\tau_{21}) \approx \frac{\tau_{21}}{\Delta\tau} u(\Delta\tau). \quad (9)$$

If $u(\Delta\tau)$ is independent of the magnitude of $\Delta\tau$ (as it is for the auxiliary interferometer calibration routine presented in the previous section), Equation 9 reveals that the accuracy of relative distance measurements can be improved by increasing the total time domain range of the system beyond simply that which is necessary to measure the distances of interest. The overall limitation on $\Delta\tau$ in swept-wavelength implementations is generally imposed by either the coherence length of the laser or the speed capability of the data acquisition system.

While the absolute accuracy of thickness measurements is determined as described in the previous paragraph, it is worth noting that the sensitivity of the measurement is significantly better than the overall uncertainty in $\tau_{21}$ suggests. This is because the uncertainty in the time domain step size is constant for any given set of measurements. This can be exploited for highly precise relative measurements, such as thickness variations in a single sample. In this case $u(\delta\tau)$ can be ignored, and the uncertainty in the relative thickness measurement now becomes dominated by the determination of the group index. To illustrate this case, taking $u(\delta\tau)=0$ for the experimental thickness measurement of the fused silica plate, the uncertainty is reduced to ±4.5 nm. Furthermore, for relative measurements on the same sample where the group index doesn't change, or if the group index were known exactly (for example, in a measurement of the variation in thickness of a region of vacuum between reflectors), the uncertainty is further diminished. Neglecting the group index uncertainty for the fused silica test sample results in a thickness uncertainty of ±530 pm. For monocrystalline silicon, the refractive index of 3.481 at 1550 nm would yield a thickness uncertainty of 224 pm, less than half of the crystal lattice spacing of 543 pm and comparable to the Si—Si bond length of 235 pm. Our results therefore open the door to thickness profiling of macroscopic samples with single atomic monolayer resolution.

Figure 9:
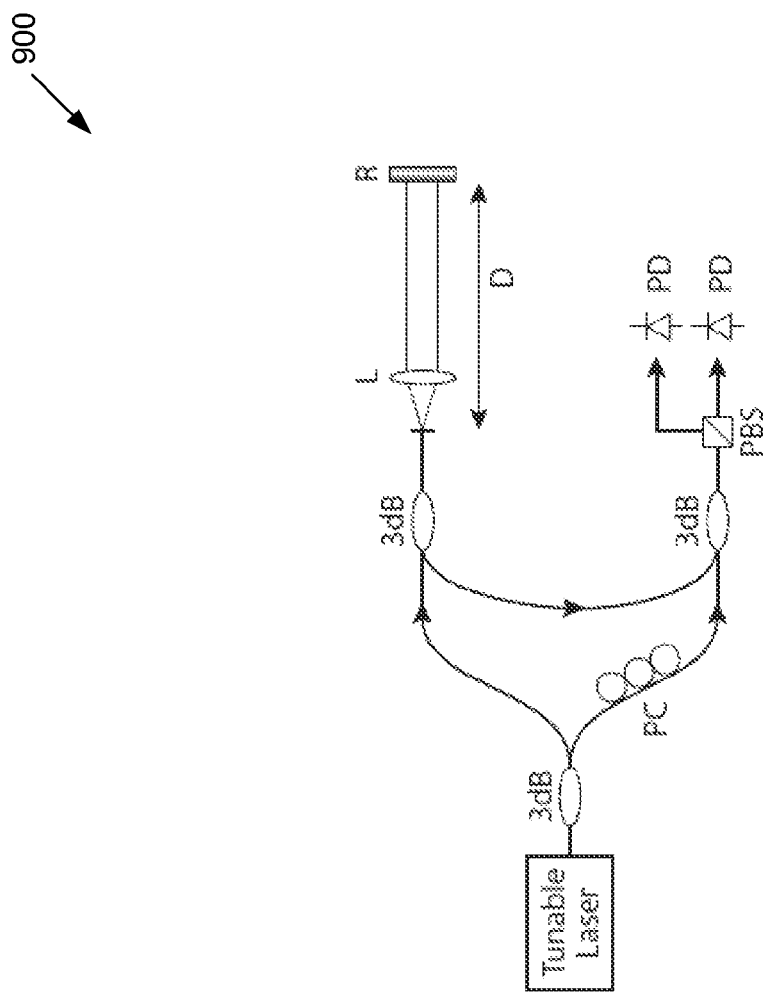
FIG. 9 is a schematic illustration depicting the architecture of a system for performing distance or displacement measurements using SPA according to various embodiments of the present invention.

Another exemplary application of highly precise optical path length measurements is for displacement measurement and sensing. Numerous applications require measurements of distance and displacement, which can be defined as a change in location or a change in distance to a location. In such an application, one path in a frequency-domain interferometry system is a reference path and the other path (the test path) contains a reflector at an unknown distance. The test path may also contain a reference reflector at a known distance that may be used for self-referencing. A single measurement incorporating SPA may be used to determine the unknown distance to the reflector. A second such measurement performed at some time interval following the first may be used to determine a change in the distance to the reflector. The difference between the first and second distance measurements provide a determination of the displacement of the reflector that occurred during the time interval between the first and second precision ranging measurement. FIG. 9 shows one embodiment of the invention for distance and displacement measurement.

The embodiments shown in FIG. 9 include features that are preferred but not required, such as a transmissive reference paths, radiation path splitting and combination via 3 dB fiber couplers, and polarization diverse detection. The interferometer geometry may utilize a reflective, transmissive, or common-path reference arm. The splitting ratio between radiation paths in the system may utilize any splitting ratio, and different splitting ratios may be preferred for different applications. Detection may be polarization diverse or not, and it may be accomplished using one or more discrete detector elements or using an array of detector elements such as CCD array or CMOS image sensor.

Figure 10:
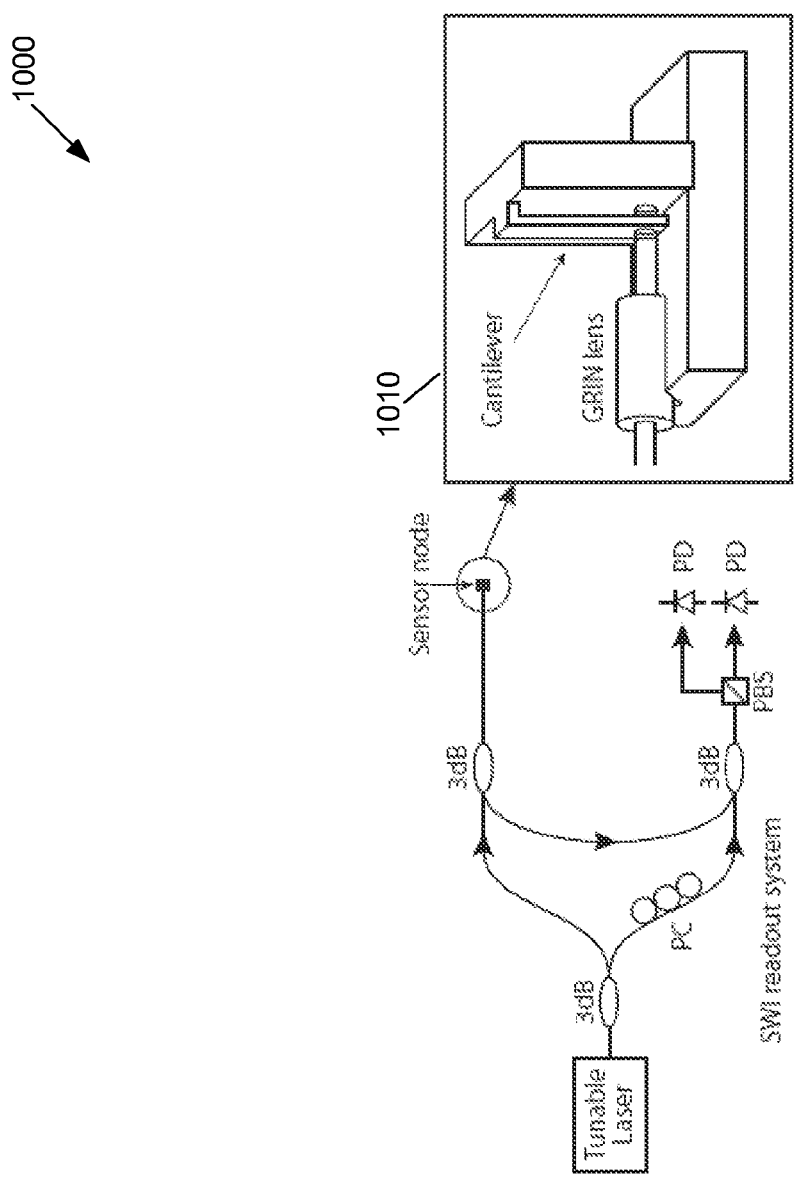
FIG. 10 is a schematic illustration depicting the architecture of a system for sensing using a cantilever transducer according to various embodiments of the present invention.

A further exemplary application of the present invention is sensing based on optical path length transduction. Numerous physical quantities may be transduced to yield a displacement value through the use of appropriate sensor modules. Such modules may take the form of a cantilever or torsion bar that flexes or rotates in response to an applied stimulus. Frequency-domain interferometry incorporating SPA can perform precise position or displacement measurements of such sensor modules, and in this way SPA may be employed to sense any physical quantity that can be transduced to a change in optical path length. Many such transducers for sensing a wide variety of physical quantities exist, including: magnetic fields, chemical and biological agents, force or acceleration, air pressure, air speed, temperature, stress or strain, humidity, and particulates. FIG. 10 illustrates one embodiment of the invention for sensing using a cantilever transducer 1010.

Because frequency-domain interferometry fundamentally performs a measurement of optical path length, which is the product of refractive index and physical length, the invention may be used to perform sensing based on changes in either quantity. We have described above how frequency-domain reflectometry coupled with SPA may be used to perform sensing based on changes in physical length, or displacement. The invention may also be used for sensing applications in conjunction with transducers that respond to stimuli via a change in refractive index.

Figure 11:
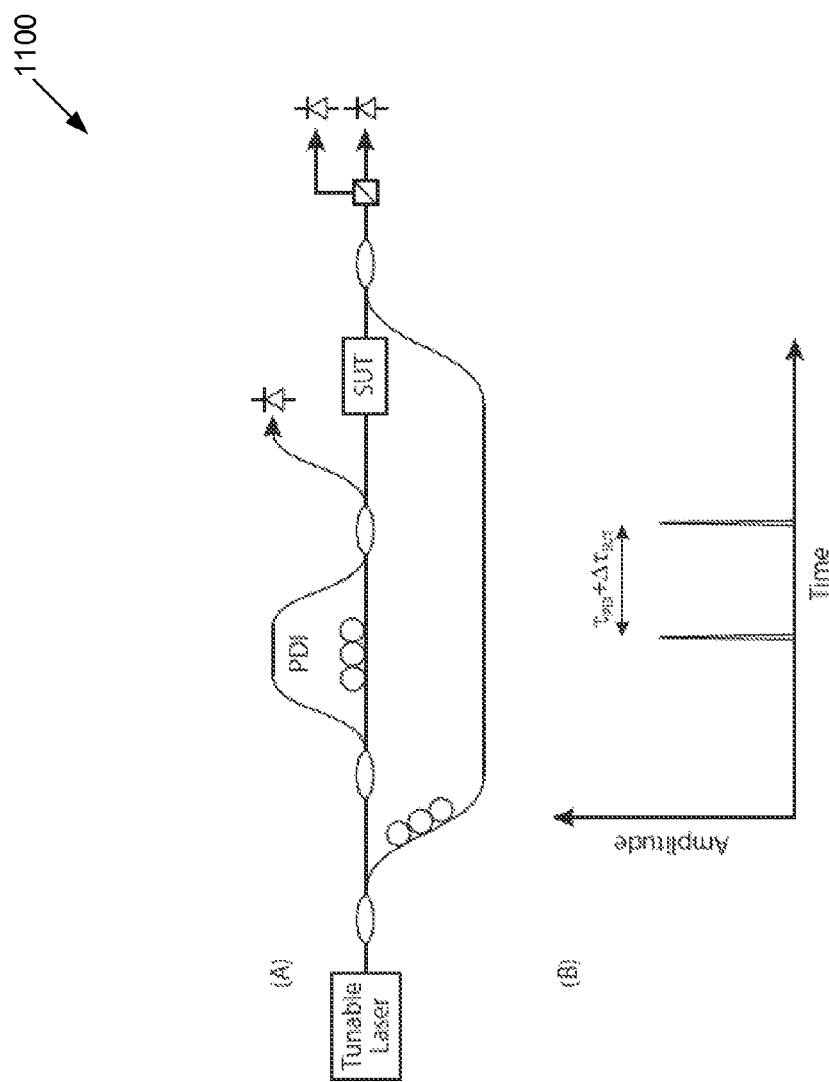
FIGS. 11A and 11B depict birefringence measurement according to various embodiments of the present invention.

In birefringent materials, the refractive index experienced by an electromagnetic wave in the material depends on the polarization of the electromagnetic wave itself. Various embodiments of the present invention may be employed using two orthogonal polarizations in order to precisely determine the birefringence of a medium. These orthogonal polarizations may be launched sequentially using two independent measurements, or they may be launched simultaneously and separated in the time domain using a polarization delay interferometer (PDI) as shown in FIG. 11. The use of a PDI to launch orthogonal polarizations together with polarization diverse detection provides enough information to determine the maximum optical path length difference associated with the principal polarization states of the sample under test. Along with the capability to perform measurements of birefringence also comes the ability to sense changes in birefringence allowing the application of the invention to sensing applications that employ transducers that respond to stimuli via a change in birefringence.

Figure 12:
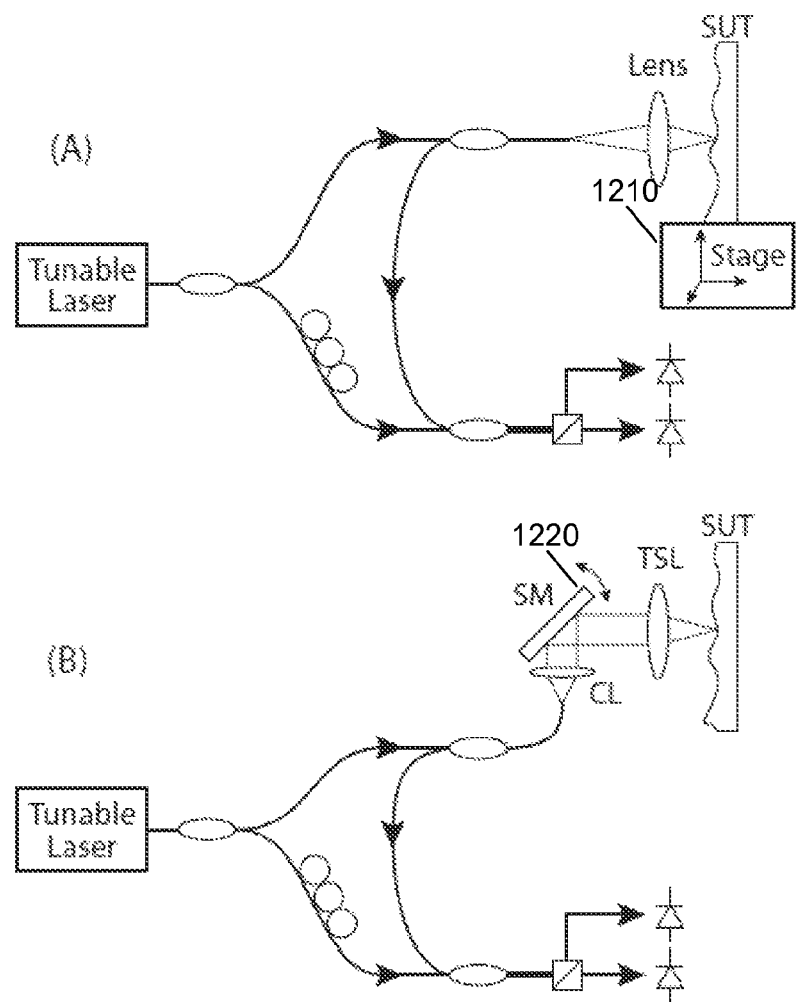
FIGS. 12A and 12B show schematic illustrations of various embodiments of the present invention for performing surface profile measurements or three-dimensional imaging incorporating scanning mechanisms.

A further exemplary application of the present invention is for surface profilometry measurements. In one such embodiment, a frequency-domain interferometry system can be configured to operate in reflection and equipped with a focusing lens and either a scanning translation stage on which to mount a sample under test or a scanning mirror to steer the probe beam. As in other applications of frequency-domain interferometry, SPA may be employed to improve measurement precision. In such a system, the range to each point on the surface of the sample under test is measured as a function of transverse coordinate as either the sample position or the probe beam position is varied. FIG. 12A illustrates one embodiment of the invention for performing surface profilometry using a translation stage 1210. FIG. 12B shows another embodiment of the invention for performing surface profilometry using a scanning mirror 1220 to steer the probe beam. In addition to the surface profile, embodiments of the present the invention also offers the ability to measure spatial reflectivity variations in a sample by monitoring the amplitude of return signal as a function of transverse coordinate.

Figure 13:
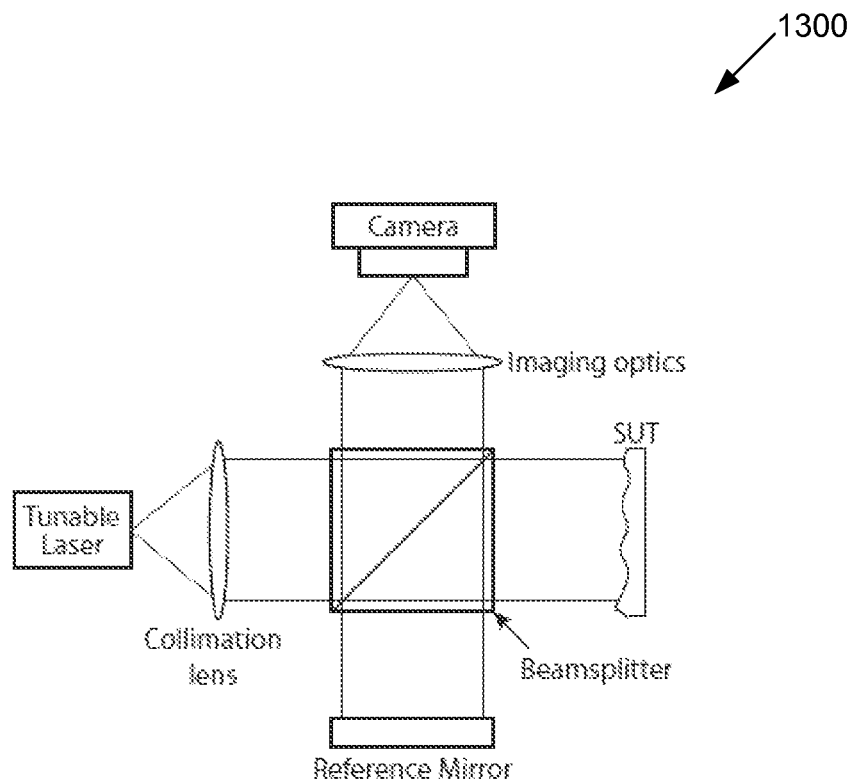
FIG. 13 shows a conceptual drawing of some embodiments of the present invention for performing surface profile measurements or three-dimensional imaging incorporating parallel detection channels.

In a further embodiment of the invention, surface profilometry may be performed without any scanning mechanisms through the use of free space optics and full-field detection using an image sensor such as a CCD array or CMOS camera. A system 1300 implementing this approach is shown in FIG. 13. In such an embodiment, a beamsplitter and a set of imaging optics (which may include one or more optical elements such as lenses) cause the spectral interference fringes to be directed onto the image sensor. In this embodiment, multiple image frames are acquired as the source radiation frequency of is swept, and a Fourier transform is performed on the time sequence data for each image pixel independently. Each pixel acts as spatial channel equivalent to the single channel ranging system shown in FIG. 9. The time domain windowing and frequency domain phase curve fitting steps of the SPA method are performed on the data for each pixel. In this way, a full-field depth image of a reflecting object may be acquired using a single wavelength sweep. The use of an image sensor for full-field optical path length measurements is also applicable to swept-wavelength interferometry systems operating in transmission. Additionally, a two-dimensional image sensor may be employed in a spectral-domain interferometry system, where one dimension of the image sensor yields spatial information, while the other dimension yields spectral information.

Figure 14:
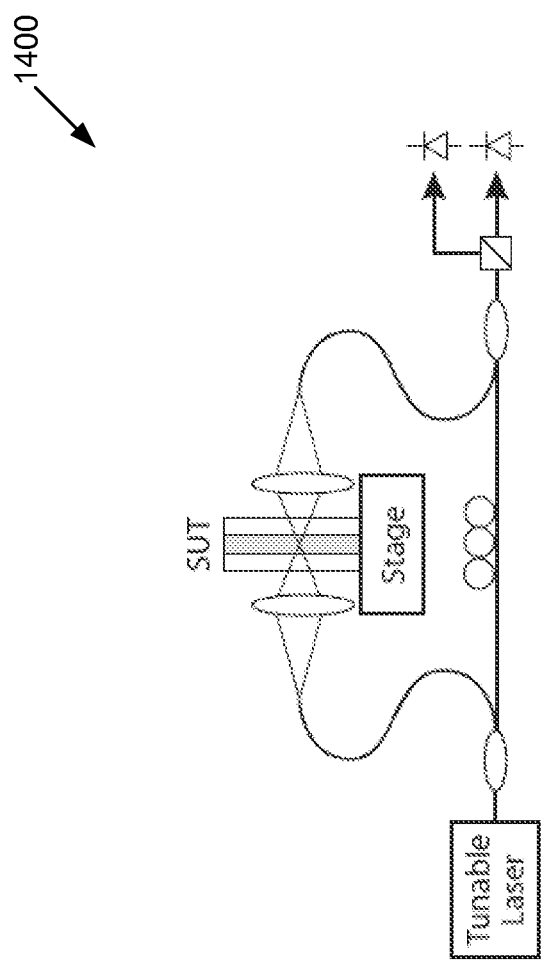
FIG. 14 is an illustration of a system for scanning phase microscopy according to various embodiments of the present invention.

Because frequency-domain interferometry performs a measurement of optical path length, the same type of spatially resolved measurements described above for surface profilometry can also be used in conjunction with a transmissive interferometry system to perform phase imaging. Such a system performs a measurement of optical path length transmitted through a sample as function of transverse coordinate. One embodiment of such a system 1400 is illustrated in FIG. 14. Transmission phase imaging may also be accomplished in a full-field configuration using a camera and free space optics configured in, for example, a Mach-Zehnder geometry rather than the Michelson geometry shown in FIG. 13 for surface profilometry. Additionally, spatially resolved optical loss measurements may also be produced by monitoring the transverse variation of the amplitude of the transmitted signal.

Optical diffraction tomography (ODT) is a technique for measuring the structure of objects by measuring the amplitude of diffracted light as a function of both incident angle and diffracted angle. These measurements provide a sampled version of the Fourier transform of the complex refractive index distribution present in the sample under test. In general, the Fourier transform of the sample's refractive index distribution will be a complex function with both amplitude and phase values for each incident and diffracted angle. But because direct optical measurements are sensitive to intensity rather than electric field, no phase information is available and successful reconstruction of the sample index distribution then relies on some a priori knowledge about the sample.

For this reason, ODT measurements using direct detection are limited in the types of objects that can be measured. If, on the other hand, a frequency-domain interferometry system is used for ODT measurements using an embodiment such as the one illustrated in FIG. 15, both amplitude and phase information can be acquired for each incident and transmitted angle, enabling measurement of arbitrary samples without prior knowledge about their structure. In addition to providing phase information, the coherent detection employed in frequency-domain interferometry provides superior sensitivity and dynamic range relative to direct detection allowing for the detection of weaker diffracted fields.

Figure 15:
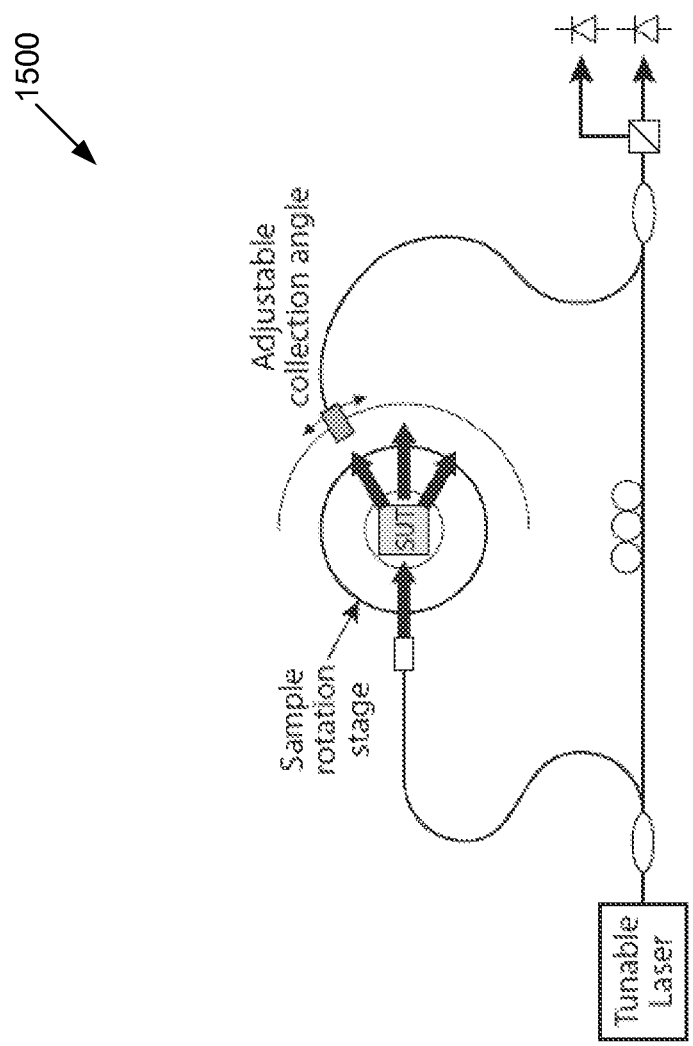
FIG. 15 is an illustration showing exemplary embodiments of a system for utilizing frequency domain interferometry to perform phase-sensitive optical diffraction tomography.

In the embodiment of FIG. 15 a swept-wavelength interferometry implementation of ODT 1500 is shown, though spectral-domain interferometry could also be used in other embodiments. In the measurement arm of the interferometer, light is incident on and diffracted by the sample under test. The sample is mounted on a rotation stage, which allows the sample to be illuminated along multiple illumination angles. The diffracted light is collected sequentially as a function of angle by a movable collection optic, and the collected diffracted light is then recombined with light traversing the reference path prior to detection. A single collection path and a single reference path are illustrated, but other embodiments may employ multiple collection and/or reference paths. The amplitude and phase of the detected spectral interference fringe signal as a function of both incident and diffracted angle are then used to tomographically reconstruct a representation of the sample under test. The SPA method may be employed to improve the precision of the phase measurements in embodiments of ODT implemented using frequency domain interferometry.

Figure 16:
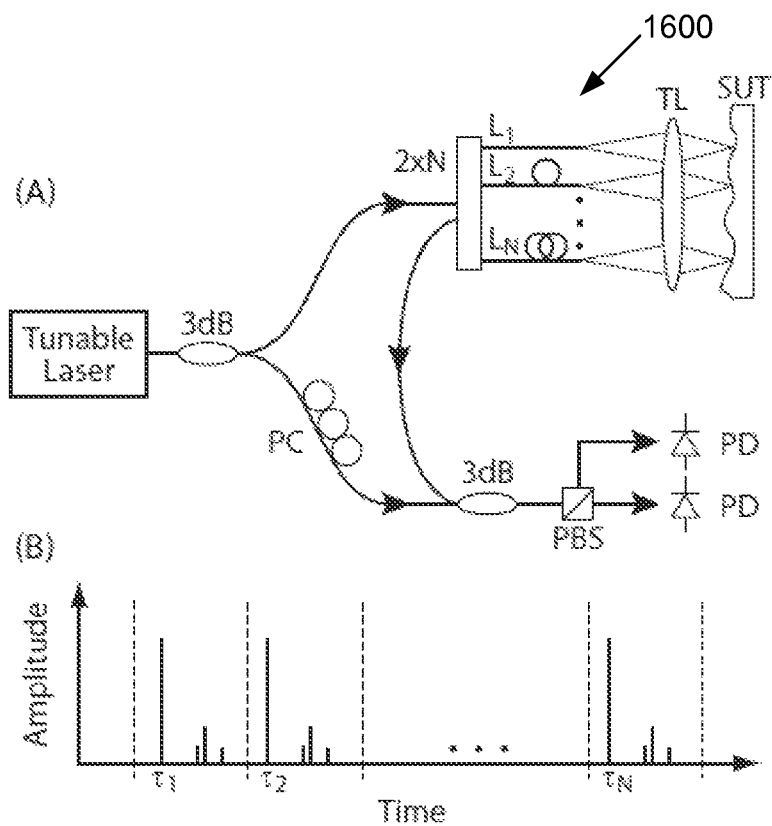
FIGS. 16A and 16B illustrate time domain multiplexing for spatially resolved measurements according to various embodiments of the invention.
Figure 17:
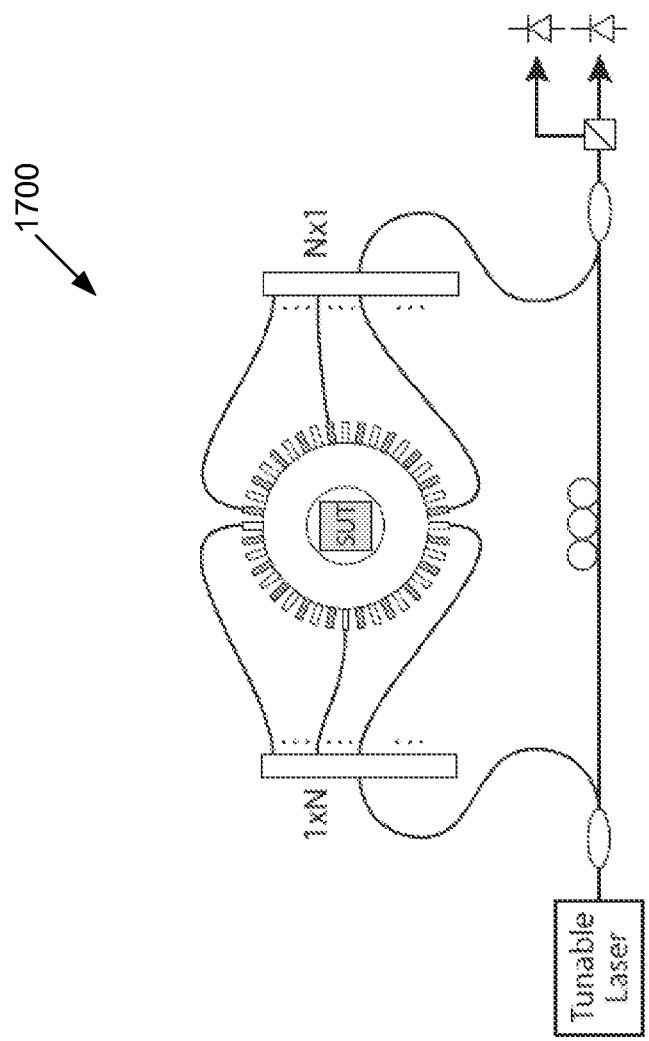
FIG. 17 is a conceptual illustration showing exemplary embodiments of the invention incorporating time domain multiplexing into a frequency-domain interferometry system for performing phase-sensitive optical diffraction tomography.

In the above descriptions of embodiments of the invention suitable for surface profilometry, phase microscopy, and ODT, spatial variation of the sample under test (either translation or rotation) is accomplished via physical motion of the sample together with sequential interference fringe acquisitions, or through the use of parallel spatial channels enable by a detector array such as a CCD or CMOS camera. Alternatively, spatially resolved measurements may be accomplished using a single frequency-domain interferometry measurement through the use of time domain multiplexing of multiple probe beams and/or multiple signal collection channels. This concept of time domain multiplexing is illustrated in FIG. 16 for one example embodiment of a surface profilometry system 1600, and in FIG. 17 for another example embodiment of a swept-wavelength ODT system 1700. Other embodiments may include various implementations of swept-wavelength interferometry or spectral-domain interferometry designed for a variety of applications, such as transmissive phase imaging.

While applicable to spectral-domain interferometry systems, time-domain multiplexing is particularly well suited to implementation incorporating highly coherent swept-frequency radiation sources. At near infrared wavelengths such as the telecommunications C band, such sources are commercially available with coherence lengths of a kilometer or more. The coherence length of the source provides an upper limit on the full range measurable by a swept-wavelength interferometry system. For profilometry, microscopy, and tomography applications, however, the small size of the sample under test may require only a few millimeters or centimeters of depth range for each measured point. Thus other paths may be built into the interferometer system that have different lengths so that the measured signal from each path is separated in the time domain data set following application of a Fourier transform to the sampled interference fringe signal observed at the detector.

By appropriately choosing the lengths associated with each of one or more source paths and one or more collection paths, the signal associated with each source/collection path pair is readily identifiable and distinguishable in the time domain data set. Furthermore, if each source/collection path pair is arranged to have a specific spatial arrangement relative to the sample under test, the signal received from each pair may be associated with a specific set of sample coordinates. Such coordinates may be chosen to be transverse Cartesian coordinates, as in the profilometry system 1600 of FIG. 16, or angular coordinates as in the ODT system 1700 of FIG. 17. In all such cases, SPA may be used in conjunction with time domain multiplexing to improve the precision of range or phase measurements. The time-domain multiplexing approach may be particularly useful for ODT, where it enables illumination of the object and detection of diffracted light throughout a complete 360° about the sample under test. Such a large angular range is difficult to achieve using a sequential measurement approach. Sampling a larger set of incident and diffracted angles enables higher-resolution imaging of the sample.

Figure 18:
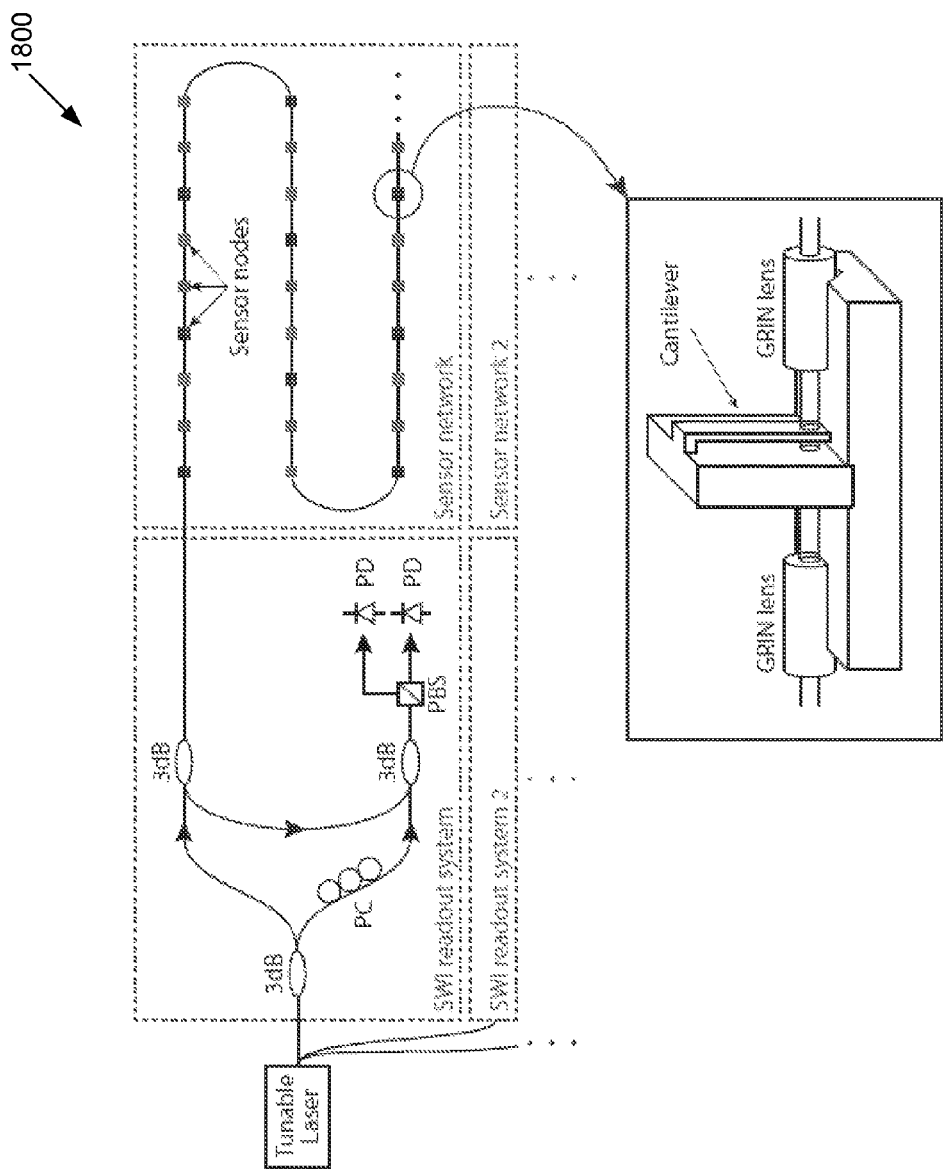
FIG. 18 depicts a frequency domain interferometry system for time domain multiplexed sensing according to some embodiments of the invention.

In addition to spatially resolved measurement applications such as imaging, surface profilometry, and ODT, time domain multiplexing may be used to multiplex multiple transducers to produce a sensing network. The use of SPA in conjunction with time domain multiplexing allows for large networks of extremely precise sensors. An example embodiment of the invention for producing sensor networks is illustrated in FIG. 18. In this example, the sensor nodes utilize transmissive cantilever transducers with transparent substrates, allowing for daisy chaining of multiple sensor nodes that are all read out in reflection. The EM radiation incident on the cantilever may be collimated by a gradient index (GRIN) lens. Part of the incident light is reflected from the cantilever and another part of the incident light is transmitted through the cantilever module where it may be collected by a second GRIN lens and directed onward to the remainder of the sensor network. The sensor nodes may all sense the same physical quantity, or they may perform different types of sensing tasks. The sensor nodes may utilize displacement, refractive index, or birefringence transduction of one or more external physical quantities. The number of sensor nodes that may be read out by a single system may be limited by one or more of the following: the coherence of the laser source, the sampling rate of the data acquisition system, the depth range required for each sensor node, and/or the optical loss associated with each node. The sensor network may be expanded beyond such a limit using a second frequency-domain interferometer that utilizes either the same or a different radiation source.

CONCLUSION

In conclusion, the present invention provides novel systems, methods and arrangements for optical path length measurements using phase sensitive frequency-domain interferometry yielding self-referenced group delay measurements with attosecond-level precision. This corresponds to sub-nanometer sensitivities for relative distance measurements. Various embodiments of the present invention allow the accuracy of absolute range measurements to depend not only on the measurement noise floor, but also on accurate calibration of the time domain sampling interval. For macroscopic distance measurements, the uncertainty in this calibration dominates over the uncertainty due to measurement noise. The contribution to the uncertainty due to the sampling calibration can be reduced by increasing the time domain range of the measurement, or equivalently by sampling on a finer grid in the frequency domain. To experimentally demonstrate an application of the proposed phase-sensitive range measurements, a simultaneous measurement of the group index and thickness of a fused silica plate was used. The uncertainty in the resulting group index measurement was $\pm 2 \times 10^{-6}$, and for the thickness measurement the uncertainty was ±61 nm. Alternative embodiments of the invention may be employed to perform distance or displacement measurements, sensing of external physical quantities using appropriate transducer sensor modules, surface profilometry, phase imaging, optical diffraction tomography, or other types of measurement or sensing.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

We claim:

1. A method comprising:
receiving a signal representing spectral interference fringes;
generating a filtered temporal signal based on the signal representing the spectral interference fringes;
generating a spectral signal from the filtered temporal signal;
identifying a set of curve-fit parameters that approximate the phase of the spectral signal; and
estimating one or more unknown optical path length values using the set of curve-fit parameters.

2. The method of claim 1, wherein generating the filtered temporal signal includes generating a temporal signal from the signal representing the spectral interference fringes and applying one or more temporal filters to the temporal signal to generate the filtered temporal signal.

3. The method of claim 2, wherein generating the temporal signal includes using a Fourier Transform, a Fast Fourier Transform, or a non-uniform discrete Fourier Transform.

4. The method of claim 1, wherein the one or more unknown optical path length values represents a physical range to a point or region on an object.

5. The method of claim 4, further comprising inducing a relative translation between the object and a probe beam.

6. The method of claim 1, further comprising generating the signal representing spectral interference fringes using a detector array.

7. The method of claim 6, wherein the detector array is a CCD array or a CMOS camera.

8. The method of claim 1, wherein the signal representing the spectral interference fringes represent reflections from one or more points on a surface of an object and the method further comprises generating a three-dimensional surface profile of the object from estimating the one or more unknown optical path length values.

9. The method of claim 1, wherein the one or more unknown optical path lengths describe the state of one or more transducers and the method further comprising estimating one or more physical quantities based on the one or more optical path lengths estimated using the set of curve-fit parameters.

10. The method of claim 9, wherein the transducer includes a cantilever or a torsion bar.

11. The method of claim 9, wherein the transducer varies a refractive index of a medium in response to the physical quantity.

12. The method of claim 1, further comprising generating the signal representing spectral interference fringes using multiple paths having different optical path lengths.

13. The method of claim 12, wherein generating the filtered temporal signal includes separating one or more of the multiple paths using a temporal filter.

14. The method of claim 1, further comprising detecting the spectral interference fringes using spectral-domain interferometry, swept-wavelength interferometry, optical frequency domain reflectometry, swept-source optical coherence tomography, spectral-domain optical coherence tomography, frequency-modulated continuous-wave radar, or frequency-modulated continuous-wave lidar.

15. The method of claim 1, wherein the set of curve-fit parameters approximate the phase of the spectral signal with a polynomial.

16. The method of claim 1, further comprising estimating one optical path length relative to a second optical path length.

17. A system comprising:
a source capable of emitting multiple frequencies of electromagnetic radiation;
a first network coupled to the source to divide the electromagnetic radiation into a reference path and two or more test paths having different optical path lengths, wherein the electromagnetic radiation traversing the two or more test paths interact with disparate locations on an object;
a second network configured to recombine the two or more test paths with the reference path;
an observing means for observing spectral interference fringes from the second network that recombined the two or more test paths with the reference path; and
a filtering module to distinguish spectral signals corresponding to the two or more test paths by filtering the spectral interference fringes, and wherein the filtering module generates a filtered temporal signal based on the signal representing the spectral interference fringes, generates a spectral signal from the filtered temporal signal, identifies a set of curve-fit parameters that approximate the phase of the spectral signal, and estimates the different optical path lengths using the set of curve-fit parameters.

18. The system of claim 17, wherein the source produces electromagnetic radiation with a frequency that changes with time and the observing means observes the spectral interference fringes as the frequency of the electromagnetic radiation changes with time.

19. The system of claim 17, wherein the source produces broadband electromagnetic radiation.

20. A method comprising:
observing and recording spectral interference fringes as a function of angle incident onto the object and diffracted angle from the object; and
tomographically reconstructing the object using an amplitude and phase of the spectral interference finges, wherein tomographically reconstructing the object comprises:
generating a filtered temporal signal based on the spectral interference fringes;
generating a spectral signal from the filtered temporal signal;
approximating a phase of the spectral signal with a curve having a set of parameters; and
estimating one or more unknown optical path length values using the set of parameters.

21. The method of claim 20, wherein observing and recording the spectral interference fringes comprises sequentially observing and recording an incident and diffracted angle created by moving a detector or rotating the object.

22. The method of claim 20, wherein observing and recording spectral interference fringes includes measuring and observing a multiplicity of incident and diffracted angles each having unique optical path lengths, and the method further comprising distinguishing, using a temporal filtering, a signal corresponding to each incident and diffracted angle.

* * * * *